(12) United States Patent
Hwang

(10) Patent No.: US 8,451,221 B2
(45) Date of Patent: *May 28, 2013

(54) INSTRUCTION DEVICE AND COMMUNICATING METHOD

(75) Inventor: Deng-Huei Hwang, Danshui Town (TW)

(73) Assignee: IMU Solutions, Inc., Hsinchu (TW)

( * ) Notice: Subject to any disclaimer, the term of this patent is extended or adjusted under 35 U.S.C. 154(b) by 624 days.

This patent is subject to a terminal disclaimer.

(21) Appl. No.: 12/538,371

(22) Filed: Aug. 10, 2009

(65) Prior Publication Data

US 2010/0149095 A1 Jun. 17, 2010

Related U.S. Application Data

(63) Continuation of application No. 12/506,696, filed on Jul. 21, 2009.

(30) Foreign Application Priority Data

Aug. 11, 2008 (TW) ................. 97130594 A
Jul. 27, 2009 (TW) ................. 98125246 A

(51) Int. Cl.
*G06F 3/033* (2006.01)

(52) U.S. Cl.
USPC .............................. 345/157; 345/173

(58) Field of Classification Search
USPC .................. 345/156–158, 163, 169, 173
See application file for complete search history.

(56) References Cited

U.S. PATENT DOCUMENTS

| | | | |
|---|---|---|---|
| 5,440,326 | A | 8/1995 | Quinn |
| 5,898,421 | A | 4/1999 | Quinn |
| 7,233,316 | B2 | 6/2007 | Smith et al. |
| 7,262,760 | B2 | 8/2007 | Liberty |
| 2005/0125826 | A1 | 6/2005 | Hunleth et al. |
| 2006/0092133 | A1 | 5/2006 | Touma et al. |
| 2008/0100825 | A1 | 5/2008 | Zalewski |
| 2008/0165153 | A1 | 7/2008 | Platzer et al. |

*Primary Examiner* — Kimnhung Nguyen
(74) *Attorney, Agent, or Firm* — Volpe and Koenig, P.C.

(57) ABSTRACT

An instruction device is provided for communicating an instruction and an icon in an image area, and includes a motion sensing unit and a processing unit. The motion sensing unit senses a first motion to generate a corresponding first signal. The processing unit generates a first trajectory to determine a first region in the image area in response to the corresponding first signal for a decision whether the icon shall be or has been selected according to a relationship between the first region and a second region where the icon is displayed in the image area.

50 Claims, 20 Drawing Sheets

INSTRUCTION DEVICE AND COMMUNICATING METHOD

This is a continuation-in-part application of U.S. patent application Ser. No. 12/506,696 filed on Jul. 21, 2009, the contents of which are incorporated herewith for reference. The present invention relates to an instruction device and communicating method, and more particularly to a device and method for communicating an instruction with an image icon.

FIELD OF THE INVENTION

Background of the Invention

For a long time, the common operation way of a conventional two-dimensional (2D) mouse device moved on a table is that the left pushbutton of the mouse device is clicked twice quickly for performing the function of the icon after the cursor on the computer screen is positioned in the icon. Please refer to FIG. 1(a) and FIG. 1(b), which are schematic diagrams showing conventional selection configurations 911 and 912 of an icon selection system 91. As shown in FIG. 1(a), the selection configuration 911 includes a display system S91, a display area A91, a cursor C91 and a mouse device M91. Plural icons I1, I2, I3, I4, I5 and I6 are displayed in the display area A91. The mouse device M91 may be a 2D one, operated on a plane, or a three-dimensional (3D) one, operated in the air. As shown, regarding the operation of selecting the icon I2, the motion purpose of the conventional mouse device M91 is to move the cursor C91 to the desired icon I2. Therefore, the motion of the mouse device M91 is to move the cursor C91 along X or/and Y directions.

As shown in FIG. 1(b), the cursor C91 in the selection configuration 912 is used for selecting the icon I1, and the motion trace GA of the cursor C91, generally speaking, can include plural connected line segments such as those A1, A2, A3, A4, A5, A6, A7 and A8.

Recently, as the micro-electro-mechanical types of the accelerometer, the gyroscope and the e-compass are more popular, the so-called 3D Air mouse device, which senses the motion of the hand in the air thereby for controlling the computer screen cursor to select the icon and to perform the function of the icon, is developed gradually. However, comparing the 3D mouse device with the conventional 2D mouse device used on the table, there are main differences between their operations. The 2D mouse device moving on the table is always supported by the contacting surface of the table, thereby the cursor moved on the screen will not deviate from the pointed icon when the pushbutton of the 2D mouse is quickly clicked twice with a finger to perform a function of the icon in the state the icon on the screen have been selected. In contrast, the handheld 3D mouse device operating in the air, does not have an additional support; then the cursor moving on the screen by the 3D mouse is easy to deviate from the location of the selected icon due to a careless hand motion when the pushbutton is quickly clicked with a finger for performing the function of the icon, which will make a fault operation. Unfortunately, the user of a commercial product such as Air Mouse of Logitech Inc. is facing the problem.

In order to overcome the abovementioned problem, some companies arrange an active pushbutton on their products to improve the motion operation of the cursor; e.g. the 3D mouse device/Air Mouse commercial products provided by Gyration Inc. The method is described as follows. While the 3D mouse device moves in the air and the active pushbutton is also in a pressed state, then the cursor on the screen can move with the mouse device. While the cursor is positioned in the icon and the active pushbutton is released, the cursor no longer moves with the mouse device. At this moment, clicking the pushbutton performs the function of the icon even if the mouse device can move. Because relationships between the cursor on the screen and the motion of the mouse device are disconnected from each other, the cursor can be positioned in the icon to cause the function to be performed successfully. In contrast to Gyration, the other supplier in the market called Hillcrest also provides an Air mouse like device, called Freespace, and a control button to fix the cursor on the screen, which is contrary to the active button used to move a cursor on the screen, is disposed thereon. That is, in operation, the motion of the cursor is always following the movement of the Freespace device when the control button is released, however, when the control button is pressed the connection between the cursor and the device will be disconnected, the cursor is fixed on the screen and the careless motion of the device during double clicking the left button to execute the function of the selected icon, will not deviate the cursor form its location.

Although these two operation modes can cause the function to be performed correctly, this operation behavior practically violates the ergonomic motion. This operation is not only intermittent without continuity but also uncomfortable.

However, in order to overcome the drawbacks of the abovementioned conventional art, the inventor of the present application filed a Taiwan Patent Application, entitled "SELECTION DEVICE AND METHOD" with an application No. TW097130594 and cited as a reference of the present application, wherein the technical schemes thereof are provided as follows.

As shown in FIG. 2(a), which is a schematic diagram showing a system architecture 921 of the selection device and method mentioned above. The selection unit U92 is configured to have a motion F21, transforms the motion F21 into a trajectory G21, determines a region H21 in the display area A92 on the display system S92 according to the trajectory G21, and determines whether the icon I1 is to be selected according to the region H21 and a region K21 where the icon I1 is to be displayed in the display area A92.

The selection unit U92 may includes a motion sensing unit SS92 and a processing unit P92. The motion sensing unit SS92 transforms a motion F21 into a signal S1. The processing unit P92 transforms the signal S1 into a trajectory G21. In the cited reference, the processing unit P92, e.g. a microprocessor P921, determines a region H21 according to the trajectory G21 for a decision whether the icon I1 is to be selected according to a specific relationship considering the region H21 in relation to the region K21.

The operation of the selection unit in the prior art provided by the inventor of the present application, using the technology of mapping motion to locus to select and execute the function of the icon on the PC screen, is effective and easy operated for the Air mouse like device operated in the 3D dimension.

However, in the present invention, the operation of the selection unit can be further widely applied to the more various and more complicated electronic menu of the human-machine graphic interface of the family entertainment center where various functional icons of different sizes, shapes and arranges are displayed. The operation convenience for the user can be further improved, and the icon and electronic menu selecting operation for the complicated human-machine graphic interface can be improved to be more intuitive, so that the user can simply, correctly and effectively selects items of various electronic menus and causes the functions thereof to be performed.

SUMMARY OF THE INVENTION

It is an object of the present invention to determine a trajectory to circle a first region in response to a motion, or further form a geometric pattern trajectory, or form a geometric line. The first region, the geometric pattern trajectory or the geometric line is compared with a second region where an icon is located and to be selected, so that an intersection relationship having an enclosing, passing or covering therebetween is used to select the icon. After the icon is in a selected status, a motion is subsequently performed to cause a preset function of the icon to be performed, and the motion can be a movement of drawing a check mark "V", a letter "X", a circle "○", or other motions or gestures performed by the arm and the wrist. This operation method of the present invention to select and execute the function of the icon is not only conforming with ergonomics, but also smooth, complete and accomplished at one stretch.

It is therefore an aspect of the present invention to provide an instruction device for communicating an instruction and a first reaction medium and the instruction device includes a sensing unit and a responding unit. The sensing unit senses a first instruction medium to generate a corresponding first signal. The responding unit generates a geometric reference in response to the corresponding first signal for a decision whether a communication between the instruction and the first reaction medium shall be conducted according to a relationship between the geometric reference and the first reaction medium.

It is therefore another aspect of the present invention to provide an instruction device for communicating an instruction and a first reaction medium and the instruction device includes an instructing unit. The instructing unit is configured to send an instruction medium to determine a geometry reference for a decision whether a communication between the instruction and the first reaction medium shall be conducted according to a relationship between the geometry reference and the first reaction medium.

It is therefore still another aspect of the present invention to provide an instruction communicating method for communicating an instruction and a first reaction medium. The instruction communicating method includes the following steps. A geometry reference is provided in response to an instruction medium. In addition, whether a communication between the instruction and the first reaction medium shall be conducted is decided according to a relationship between the geometry reference and the first reaction medium.

It is therefore still another aspect of the present invention to provide an instruction device for communicating an instruction and a first reaction medium and the instruction device includes a sensing unit and a responding unit. The sensing unit senses an instruction medium to generate a corresponding signal. The responding unit temporarily generates a reference feature being one selected from a group consisting of a reference parameter, a positional reference and a reference signal in response to the corresponding signal for a decision whether a communication between the instruction and the first reaction medium shall be conducted according to a relationship between the first reaction medium and the selected one of a reference parameter, a positional reference and a reference signal.

It is therefore still another aspect of the present invention to provide an instruction device for communicating an instruction and a first reaction medium and the instruction device includes an instructing unit. The instructing unit is configured to send out an instruction medium to temporarily generate a reference feature being one selected from a group consisting of a reference parameter, a positional reference and a reference signal, and is configured to decide whether a communication between the instruction and the first reaction medium shall be conducted according to a relationship between the first reaction medium and the selected one of the reference parameter, the positional reference and the reference signal.

It is therefore still another aspect of the present invention to provide an instruction communicating method for communicating an instruction and a first reaction medium. The instruction communicating method includes the following steps. One selected from a group consisting of a reference parameter, a positional reference and a reference signal is temporarily provided in response to an instruction medium. In addition, whether a communication between the instruction and the first reaction medium shall be conducted is decided based on a relationship between the first reaction medium and the selected one of the reference parameter, the positional reference and the reference signal.

It is therefore still another aspect of the present invention to provide an instruction device for communicating an instruction and a first reaction medium and the instruction device includes a first responding unit and a second responding unit. The first responding unit generates a signal in response to an instruction medium. The second responding unit generates at least two positional references in response to the signal for a decision whether a communication between the instruction and the first reaction medium shall be conducted according to a relationship between the first reaction medium and the at least two positional references.

It is therefore still another aspect of the present invention to provide an instruction device for communicating an instruction and a first reaction medium and the instruction device includes an instructing unit. The instructing unit is configured to send an instruction medium to generate at least two reference signals for a decision whether a communication between the instruction and the first reaction medium shall be conducted according to a relationship between the at least two reference signals and the first reaction medium.

It is therefore still another aspect of the present invention to provide an instruction device for communicating an instruction and a first reaction medium and the instruction device includes a first responding unit and a second responding unit. The first responding unit generates a signal in response to an instruction medium. The second responding unit temporarily generates one selected from a group consisting of a reference parameter, a positional reference and a reference signal in response to the signal for a decision whether a communication between the instruction and the first reaction medium shall be conducted according to a relationship between the first reaction medium and the selected one of the reference parameter, the positional reference and the reference signal.

It is therefore still another aspect of the present invention to provide an instruction device for communicating an instruction and a first reaction medium and the instruction device includes a notifying unit and a responding unit. The notifying unit causes generated a corresponding signal in response to an instruction medium. The responding unit generates one selected from a group consisting of a reference parameter, a positional reference and a reference signal in response to the corresponding signal for a decision whether a communication between the instruction and the first reaction medium shall be conducted according to a relationship between the first reaction medium and the selected one of a reference parameter, a positional reference and a reference signal.

BRIEF DESCRIPTION OF THE DRAWINGS

The foregoing and other features and advantages of the present invention will be more clearly understood through the following descriptions with reference to the drawings, wherein.

DETAIL DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1A:
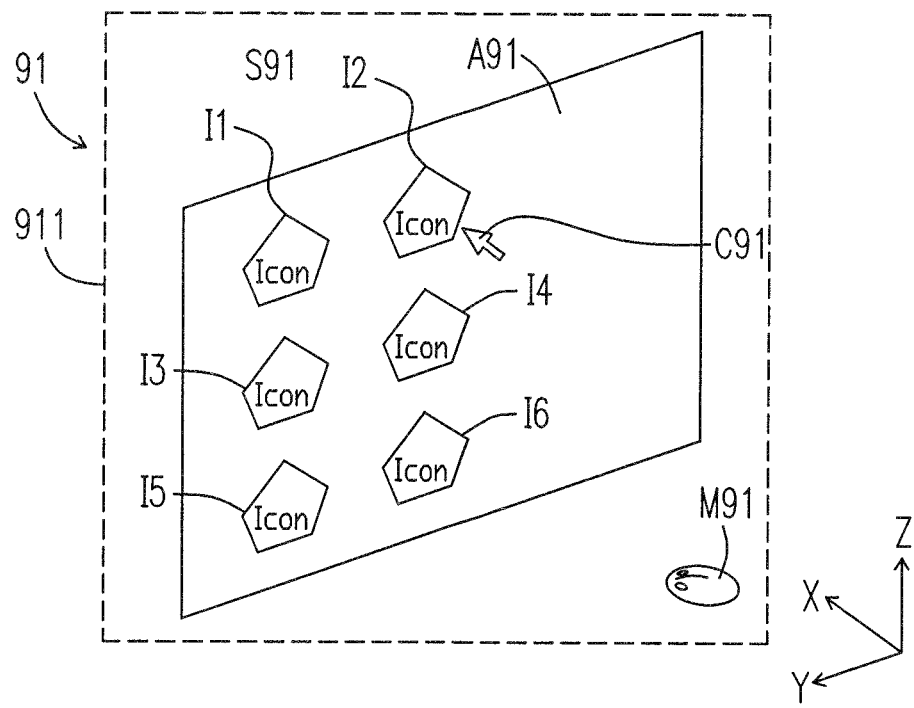
FIG. 1(a) and FIG. 1(b) are schematic diagrams showing selection configurations of a conventional selection system.
Figure 1B:
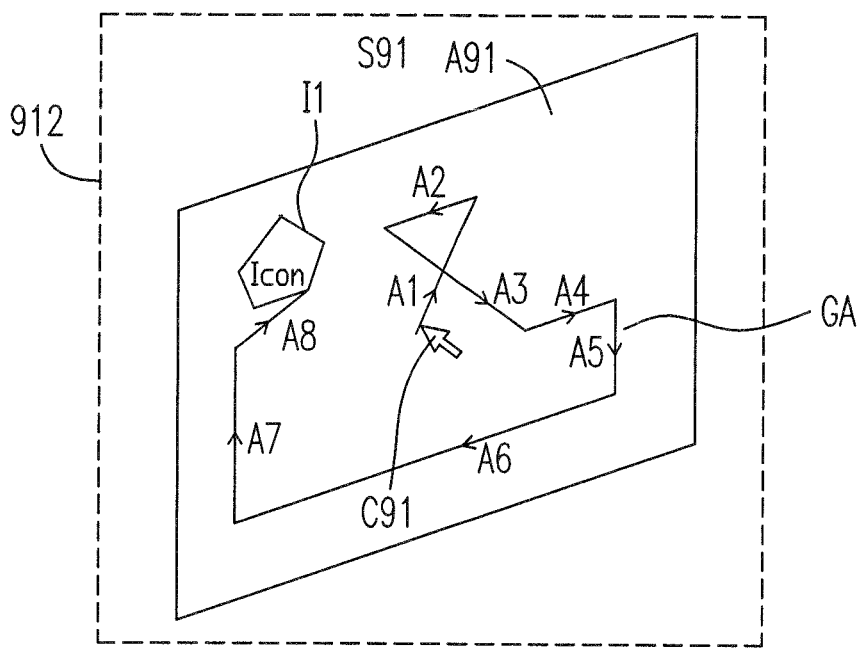
Figure 2A:
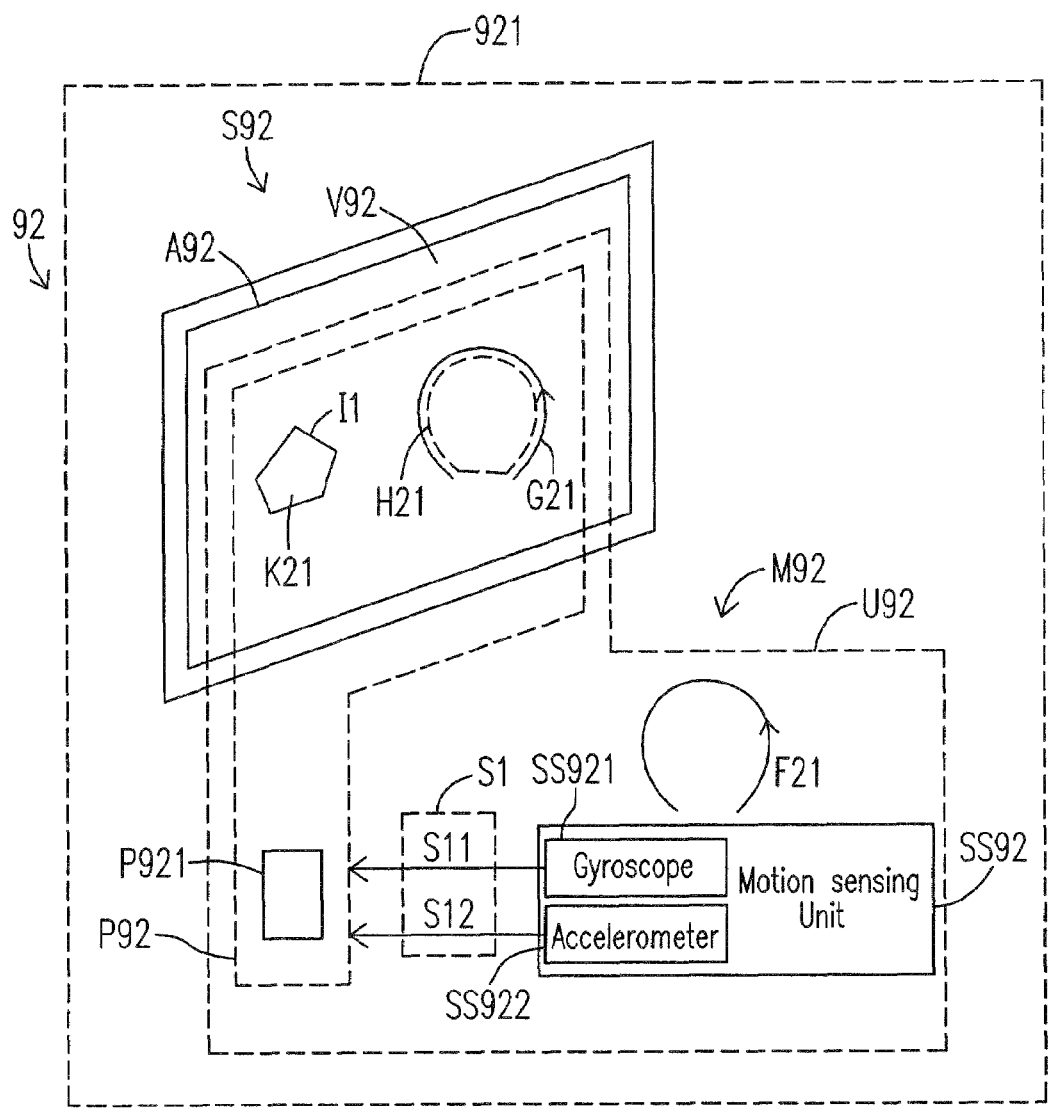
FIG. 2(a) is a schematic diagram showing a system architecture of a conventional selection device provided by the inventor of the present invention.
Figure 2B:
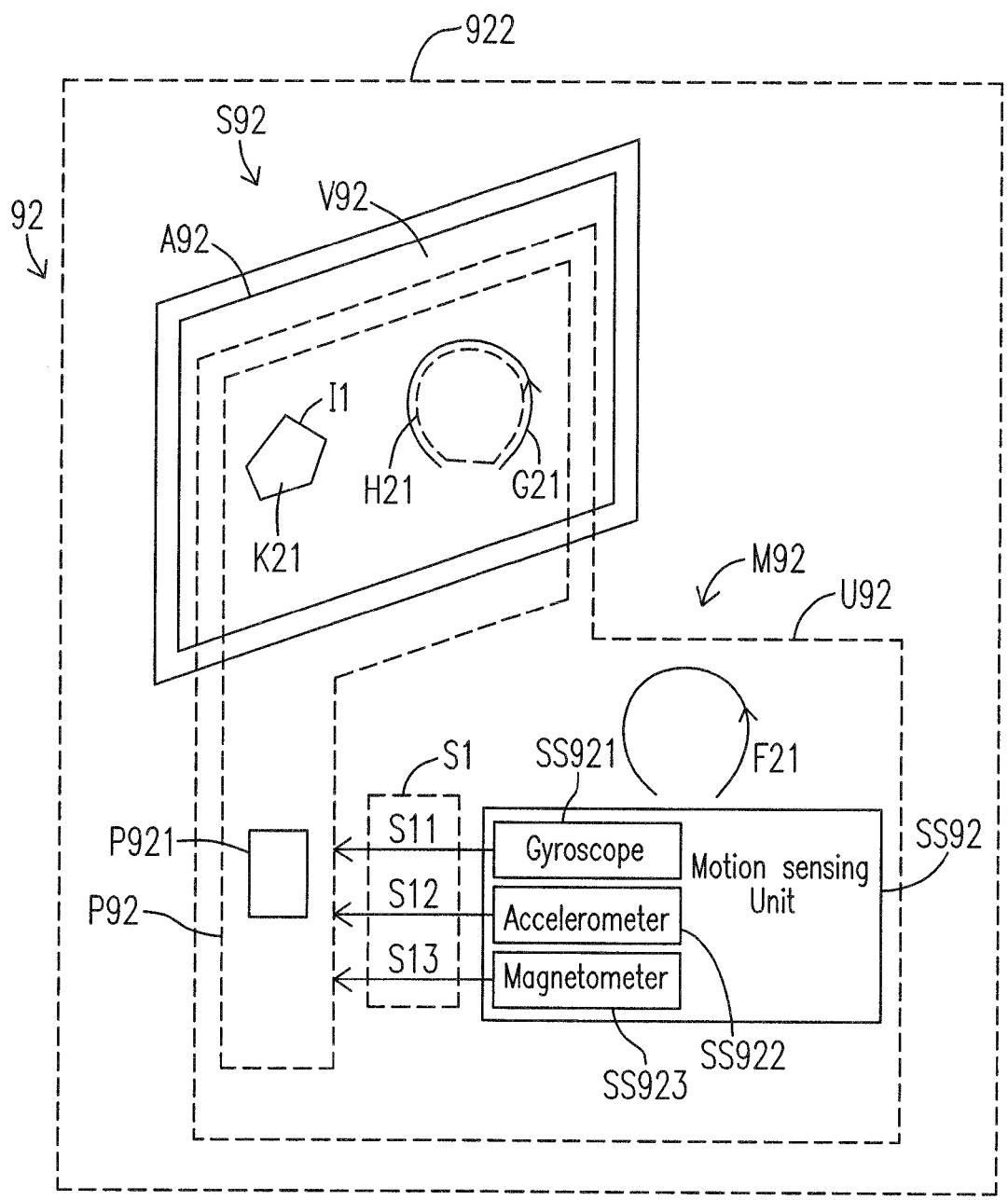
FIG. 2(b) is a schematic diagram showing a system architecture of an instruction device according to the present invention.

The system architecture of the selection device for the present invention:

Please refer to FIG. 2(b), which is a schematic diagram showing a system architecture 922 of the selection system 92 and the operation thereof according to the first embodiment of the present invention. As shown, the selection system 92 includes a display system S92 and a selection device M92. The display system S92 includes a display device V92. The display device V92 has a display area A92, and an icon I1 is displayed on the display area A92. The selection device M92 includes a selection unit U92. The selection unit U92 is used to cause the icon I1 in the display area A92 to be selected.

In an embodiment, the motion-sensing unit SS92 includes a gyroscope SS921, and the gyroscope SS921 senses the motion F21 for producing the signal S1. In an embodiment, the motion-sensing unit SS92 includes an accelerometer SS922, and the accelerometer SS922 senses the motion F21 for producing the signal S1. In an embodiment, the motion-sensing unit SS92 includes the magnetometer/e-compass SS923, and the magnetometer SS923 senses the motion F21 for producing the signal S1. In an embodiment, the motion-sensing unit SS92 includes the gyroscope SS921, the accelerometer SS922 and the magnetometer SS923. The gyroscope SS921 has at least two sensing degrees of freedom and senses the motion F21 for producing a first portion S11 of the signal S1. The accelerometer SS922 has at least two sensing degrees of freedom and senses the motion F21 for producing a second portion S12 of the signal S1. The magnetometer SS923 has at least two sensing degrees of freedom and senses the motion F21 for producing a third portion S13 of the signal S1.

Besides, the processing unit P92 may includes a controller P921 which may include at least one selected from a group consisting of a microcontroller, a microprocessor, a digital signal processor, a field-programmable gate array (FPGA) and a central processing unit (CPU).

The fundamental operations and principles depicting how a trajectory corresponds to a motion for the selection system according to the embodiments:

The selection device and the operation method thereof provided in the present invention are shown in FIG. 2(b). The selection unit U92 is configured to have a motion F21, transforms the motion F21 into a trajectory G21 on the display area, determines a region H21 in the display area A92 according to the trajectory G21, and determines whether the icon I1 is to be selected according to the region H21 and a region K21 where the icon I1 is to be displayed in the display area A92, wherein where the region K21 and the region of the icon I1 can be or not be identical to each other.

The selection unit U92 may includes a motion sensing unit SS92 and a processing unit P92. The motion sensing unit SS92 transforms the motion F21 into a signal S1. The processing unit P92 transforms the signal S1 into the trajectory G21. Of course, the processing unit P92 may determine whether the icon I1 is to be selected according to a specific relationship considering the trajectory G21 itself in relation to the region K21. Otherwise, the processing unit P92 may determine a region H121 according to the trajectory G21, and determine whether the icon I1 is to be selected according to another specific relationship considering the region H21 in relation to the region K21. The embodiments of these specific relationships will be described in the subsequent paragraphs in details.

Besides, a hand (not shown) may drive the selection unit U92 to form the motion F21 of the selection unit U92. The motion F21 may include at least one of a three-dimensional motion and a two-dimensional motion. The trajectory G21 on the display area A92 may include at least one selected from a group consisting of a first arc having an arc angle, plural second arcs, a first curve, plural second curves, a first line segment, and plural second line segments, or any combination thereof. The arc angle of the first arc is in a degree being one selected from a group consisting of 180°, beyond 180°, 360°, near 360°, and beyond 360° when the trajectory G21 is the first arc.

Of course, the motion F21 sensed by the motion sensing unit SS92 may be generated by at least one selected from a group (not shown) consisting of a hand, an arm, a foot, a leg, a head, a neck, a shoulder and a waist.

The six operation modes for the selection methods of the icon:

For the selection methods of the icon, the six operation modes provided in the present invention are described as follows. The operation methods for selecting a single specific icon are described in the technical schemes of the first to the fourth selection operation modes. The operation methods described in the technical schemes of the fifth to the sixth selection operation modes have features: several candidate icons are selected, and then a specific icon is selected from the candidate icons.

Figure 3:
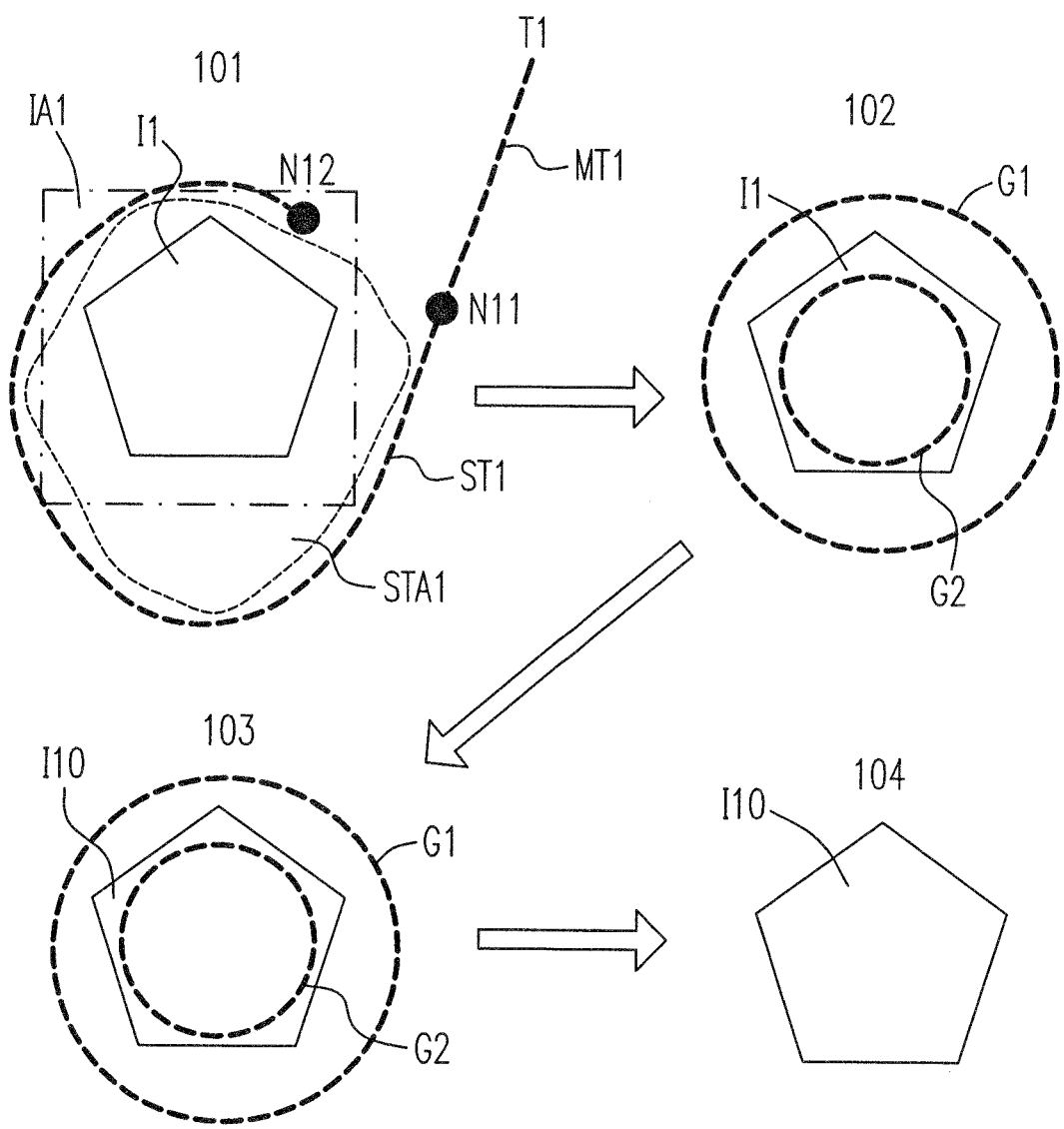
FIG. 3 is a schematic diagram showing the first icon selection operation mode for the instruction device and method according to the present invention.

As to the first selection operation mode, please refer to FIG. 3, which is an operational schematic diagram showing the first icon selection operation mode for the instruction device and method according to the present invention. In the sub-figure 101, a hand (not shown) of a user makes a motion to the selection device M92, shown in FIG. 2, of the present invention, and a trajectory T1 is displayed on the screen in response to the motion. As shown in the sub-figure 101 of FIG. 3, the trajectory T1 includes a segment of a motion trajectory MT1 and a segment of a selection trajectory ST1. The motion trajectory MT1 is formed in response to a motion of the selection device M92 driven by the hand, wherein the selection device M92 is moved from a first space position, associated with a previous reference point (not shown) on the screen, to a second space position, associated with the start point N11 of the selection trajectory ST1. The selection trajectory ST1 is formed in response to a motion of the selection device M92 driven by the hand when the hand operates the selection device M92 to circle the icon I1. The selection trajectory ST1 has the selection start point N11 and the selection end point N12, and encloses a region STA1 (the region enclosed by a dash line). The region STA1 is compared with a comparison region IA1 (the region enclosed by a dash-dot line) associated with the icon I1 for deciding whether the icon I1 is to be selected. The comparison condition may be one whether the region STA1 intersects the region IA1. The icon is selected when the comparison condition is an intersection relationship. The intersection relationship is in a specific condition, wherein the specific condition is one selected from a group consisting of: a first condition that the region STA1 partially overlaps the region IA1, a second condition that the region STA1 entirely overlaps the region IA1, a third condition that the region STA1 entirely covers the region IA1, a fourth condition that a centroid of the region STA1 is located within the region IA1, a fifth condition that a centroid of the region IA1 is located within the region STA1, a sixth condition that the trajectory ST1 passes through the region IA1, and a seventh condition that the trajectory ST1 touches the region IA1.

When the icon I1 is selected, as shown in the sub-figure 102, a geometric pattern associated with the selection trajectory ST1 is displayed to mean that the icon I1 has been selected, wherein the geometric pattern is, e.g., an outer circle G1 encircling on the periphery of the icon, or an inner circle G2 located within the icon I1. Afterward, the icon I1 is caused to change its color or is displayed in an inverse video to form an icon, as shown in the sub-figure 103, which is an inverse-video icon I10, wherein the inverse-video icon I10 is encircled by an outer circle G1, or an inner circle G2 is displayed within the inverse-video icon I10. Afterward, as shown in the sub-figure 103, either the outer circle G1 or the inner circle G2 used for prompting the user the selection status can disappear, which causes the inverse-video icon I10 to be left for showing the selection result.

Figure 4:
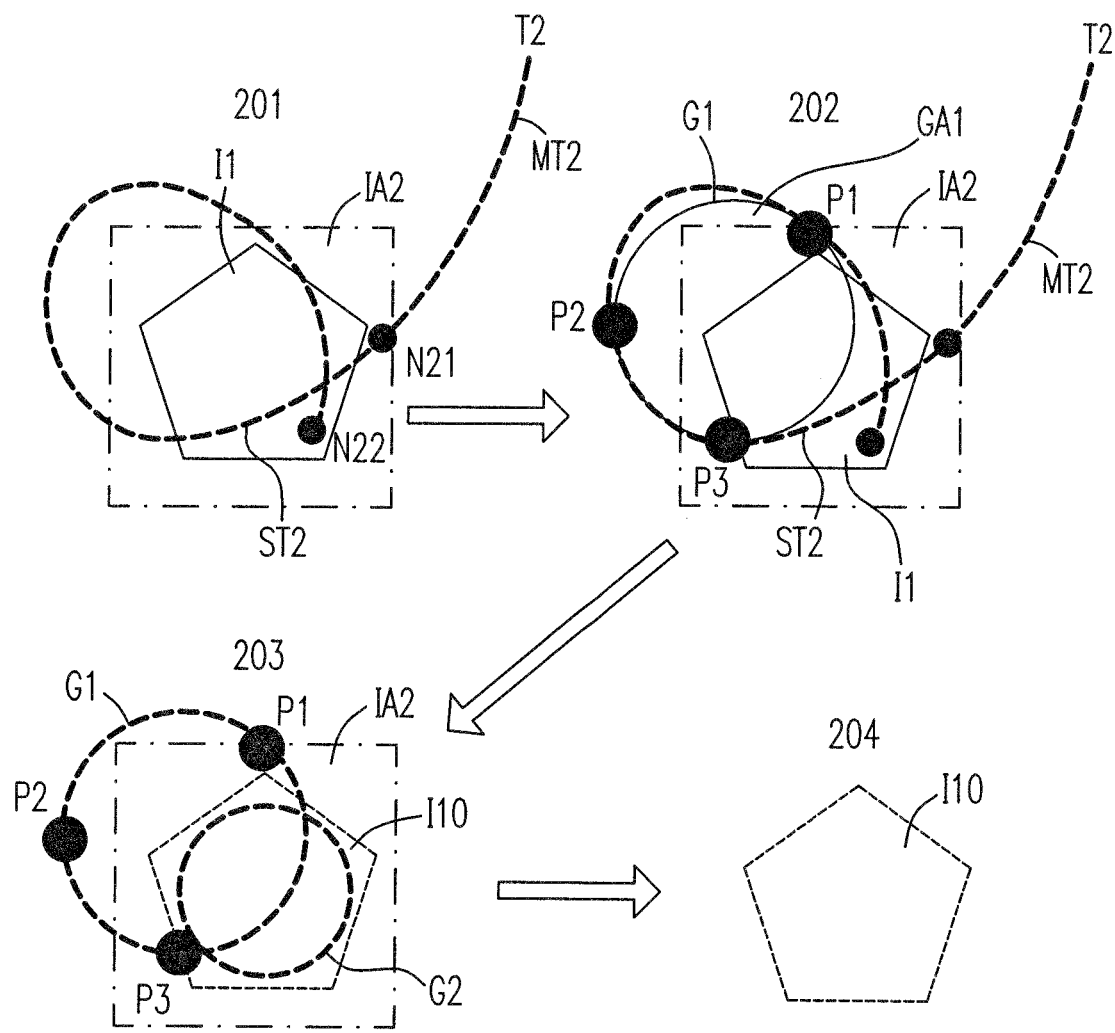
FIG. 4 is a schematic diagram showing the second icon selection operation mode for the instruction device and method according to the present invention.

As to the second selection operation mode, please refer to FIG. 4, which is an operational schematic diagram showing the second icon selection operation mode for the instruction device and method according to the present invention. In the sub-figure 101, a hand (not shown) of a user makes a motion to the selection device M92, shown in FIG. 2, of the present invention, a trajectory T2 is displayed on the screen in response to the motion. As shown in the sub-figure 201 of FIG. 4, the trajectory T2 includes a segment of a motion trajectory MT2 and a segment of a selection trajectory ST2. The motion trajectory MT2 is formed in response to a motion of the selection device M92 driven by the hand, wherein the selection device M92 is moved from a first space position, associated with a previous reference point (not shown) on the screen, to a second space position, associated with the start point N21 of the selection trajectory ST2. The selection trajectory ST2 is formed in response to a motion of the selection device M92 driven by the hand when the hand operates the selection device M92 to circle the icon I1.

The selection trajectory ST2 has the selection start point N21 and the selection end point N22. As shown in the sub-figure 202, three independent points P1, P2 and P3 are defined on the selection trajectory ST2, and are used to form a geometric pattern G1, e.g. a closed circle, through these independent points P1, P2 and P3. The geometric pattern G1 encloses a region GA1. The region GA1 are compared with a comparison region IA2 associated with the icon I1 for deciding whether the icon I1 is to be selected. Of course, the comparison region IA2 also can be equal to the region of the icon I1. The comparison condition may be one whether the region GA1 intersects the region IA2. The icon is selected when the comparison condition is an intersection relationship. The intersection relationship is in a specific condition, wherein the specific condition is one selected from a group consisting of: a first condition that the region GA1 and the region IA2 are partially overlapping, a second condition that the region GA1 and the region IA2 are entirely overlapping, a third condition that the region GA1 is entirely covering the region IA2, a fourth condition that a centroid of the region GA1 is located within the region IA2, a fifth condition that a centroid of the region IA2 is located within the region GA1, a sixth condition that the geometric pattern GA1 passes through the region IA2, and a seventh condition that the geometric pattern GA1 touches the region IA2.

When the icon I1 is selected, the icon I1 is caused to change its color or is displayed in an inverse video to form an icon, as shown in the sub-figure 203, which is an inverse-video icon I10, wherein the circle G1 defined by the three independent points P1, P2 and P3 passes through the inverse-video icon I10, or an inner circle G2 is displayed within the inverse-video icon I10. Afterward, as shown in the sub-figure 204, either the circle G1 or the inner circle G2 used for prompting the user the selection status can disappear, which causes the inverse-video icon I10 to be left for showing the selection result.

Figure 5:
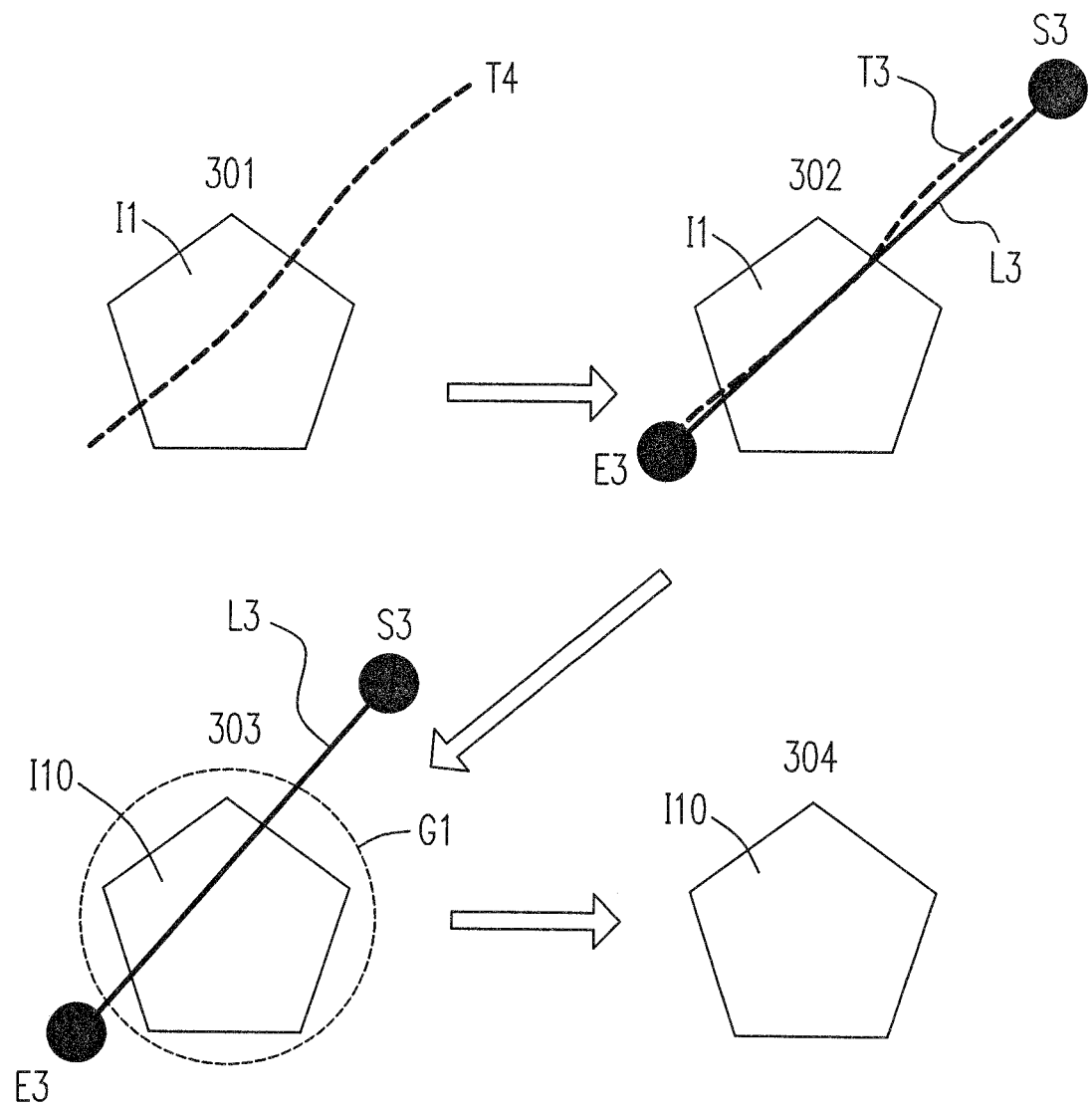
FIG. 5 is a schematic diagram showing the third icon selection operation mode for the instruction device and method according to the present invention.

As to the third selection operation mode, please refer to FIG. 5, which is an operational schematic diagram showing the third icon selection operation mode for the instruction device and method according to the present invention. In the sub-figure 301, a hand (not shown) of a user makes a motion to the selection device M92, shown in FIG. 2, of the present invention, and a trajectory T3 is displayed on the screen in response to the motion. As shown in the sub-figure 302, a reference start point S3 and a reference end point E3 may be defined on the trajectory T3. A line segment L3 is used to connect the reference start point S3 with the reference end point E3. Whether the icon I1 is to be selected may be dependent on the comparison result whether the reference line segment L3 intersects the region of the icon I1. That is to say, the decision condition may be one whether the reference line segment L3 passes through or touches the region of the icon I1. If either one of the abovementioned two condition is satisfied, the icon I1 is selected.

As shown in the sub-figure 302, when the icon I1 is passed through by the reference line segment L3 and is selected, the icon I1 can be changed into an inverse video icon I10, or, e.g., a circle G1 is used to enclose the icon I1 or the inverse video icon I10 for further reminding the user the selection status of the icon I1.

Afterward, as shown in the sub-figure 304, either the circle G1 or the line segment L3 used for prompting the user the selection status can disappear, which causes the inverse-video icon I10 to be left for showing the selection result of the icon I1.

Figure 6:
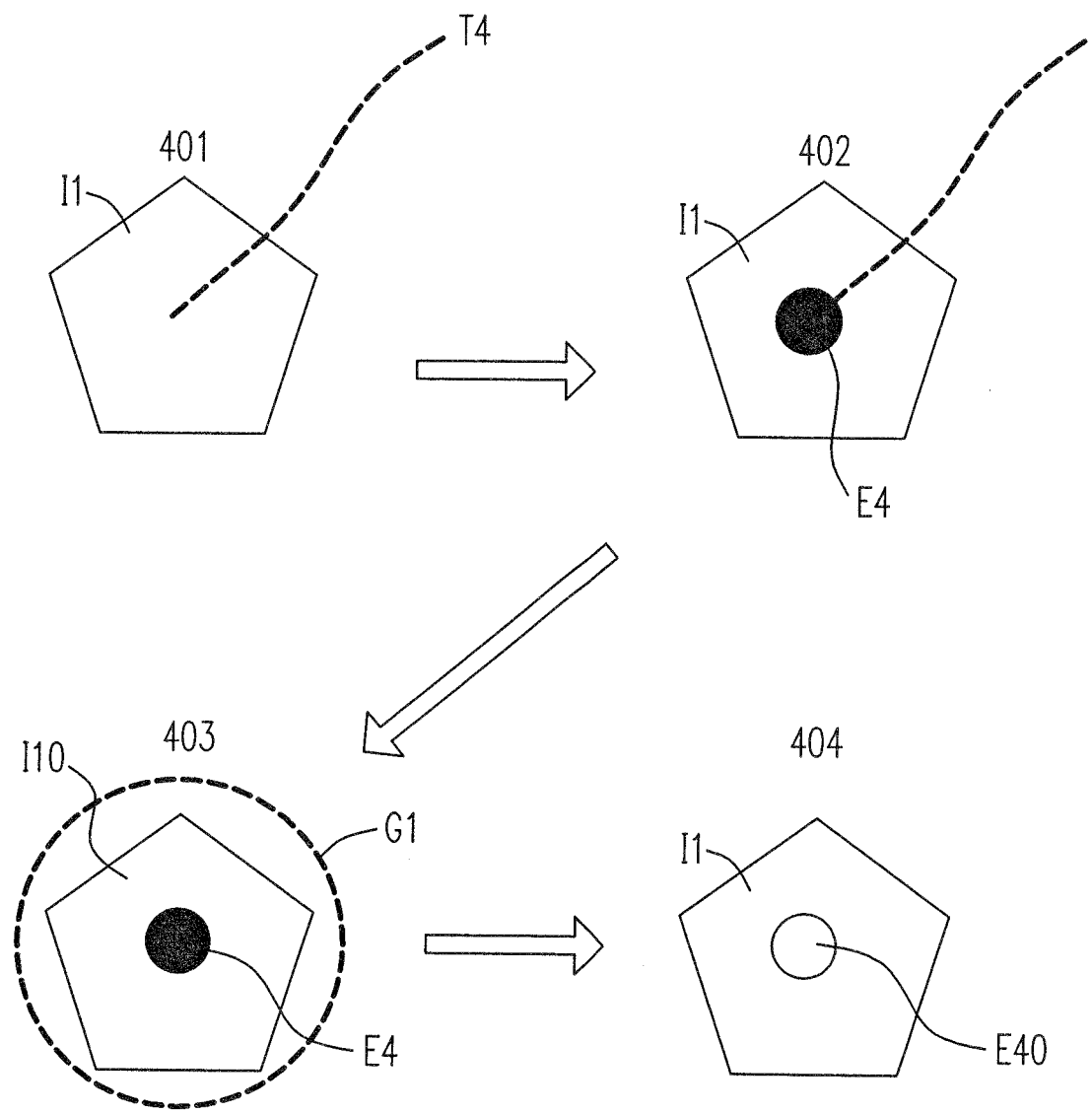
FIG. 6 is a schematic diagram showing the fourth icon selection operation mode for the instruction device and method according to the present invention.

As to the fourth selection operation mode, please refer to FIG. 6, which is an operational schematic diagram showing the fourth icon selection operation mode for the instruction device and method according to the present invention. In the sub-figure 401, a hand (not shown) of a user makes a motion to the selection device M92, shown in FIG. 2, of the present invention, and a trajectory T4 is displayed on the screen in response to the motion. As shown in the sub-figure 402, a reference end point E4 may be defined on the trajectory T4. Whether the icon I1 is to be selected may be dependent on the comparison result whether the reference trajectory T4 intersects the icon I1. That is to say, the practical decision condition may be a specific condition, wherein the specific condition is one selected from a group consisting of: a first condition whether the reference end point E4 is located within the region of the icon I1, a second condition whether the reference end point E4 touches the icon I1, and a third condition whether a portion of the trajectory T4 touches the region of the icon I1. When the specific condition is satisfied, the icon I1 is selected. As shown in the sub-figure 402, when the icon I1 is selected, the icon I1 can be changed into an inverse video icon I10, or, e.g., a circle G1 also may is used to enclose the icon I1 or the inverse video icon I10 of the icon I1 for further reminding the user the selection status of the icon I1.

Besides, as shown in the sub-figure 404, when the icon I1 is selected, a reference end point E40 with an inverse video may be displayed in the icon I1 for showing the selected result of the icon I1.

Figure 7:
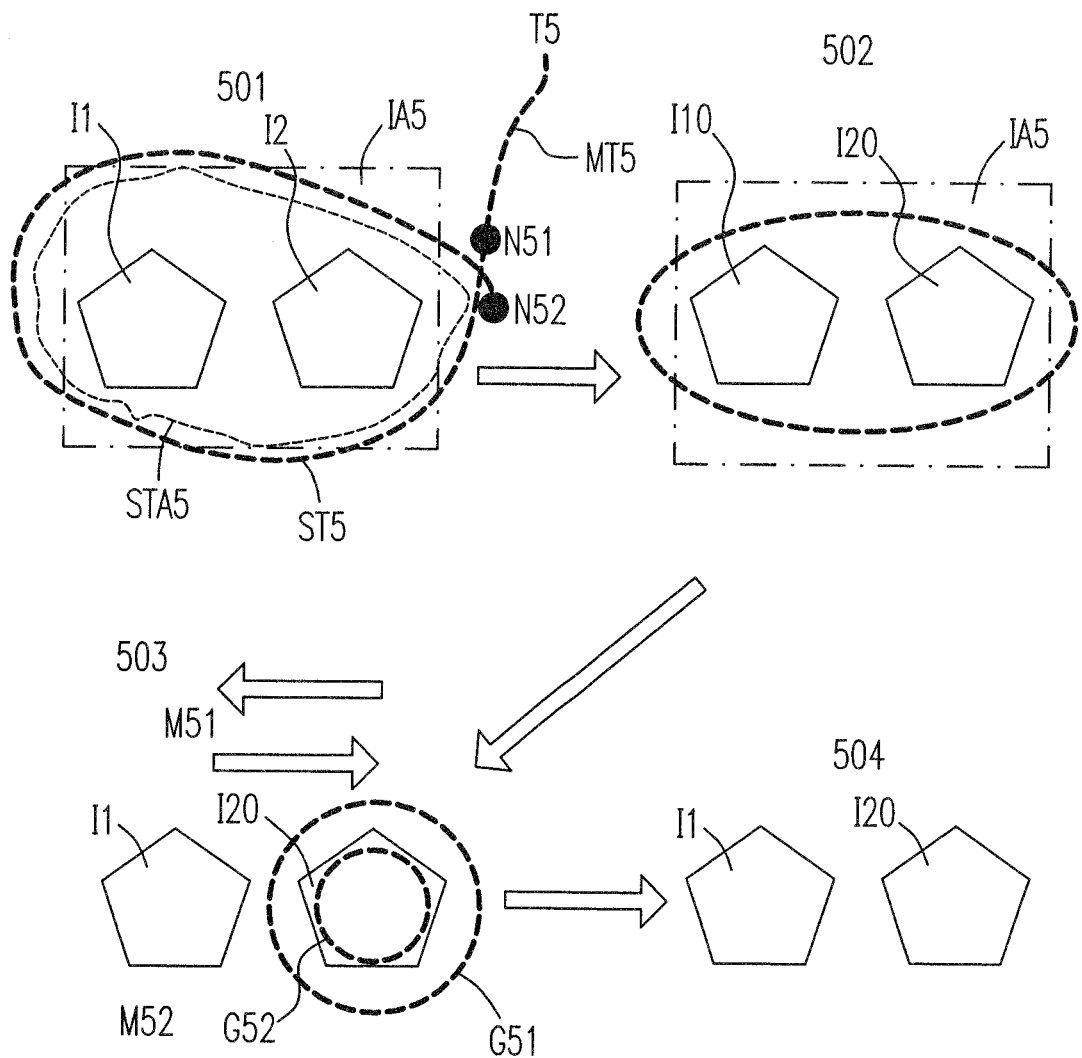
FIG. 7 is a schematic diagram showing the fifth icon selection operation mode for the instruction device and method according to the present invention.

As to the fifth selection operation mode, please refer to FIG. 7, which is an operational schematic diagram showing the fifth icon selection operation mode for the instruction device and method according to the present invention. In the sub-figure 501, a hand (not shown) of a user makes a motion to the selection device M92, shown in FIG. 2, of the present invention, and a trajectory T5 as shown in sub-figure 501 is displayed on the screen in response to the motion. The trajectory T5 includes a segment of a motion trajectory MT5 and a segment of a selection trajectory ST5. The motion trajectory MT5 is formed in response to a motion of the selection device M92 driven by a hand, wherein the selection device M92 is moved from a first space position, associated with a previous reference point (not shown) on the screen, to a second space position, associated with the start point N51 of the selection trajectory ST5. The selection trajectory ST5 is formed in response to a motion of the selection device M92 driven by the hand when the selection device M92 is used to circle the icons I1 and I2, or when the selection device M92 is used to circle a comparison region IA5 containing the icons I1 and I2.

The selection trajectory ST5 has the selection start point N51 and the selection end point N52, and encloses a region STA5 (the region enclosed by a dash line). The region STA5 is compared with the comparison region IA5 (the region enclosed by a dash-dot line) containing the icons I1 and I2 for deciding whether the icons I1 and I2 are to be selected together. The comparison condition may be one whether the region STA5 intersects the region IA5. When the comparison condition is in a specific condition, it is made the decision that the region IA5 or the icons I1 and I2 in the region IA5 is circled and marked by the selection device M92, wherein the specific condition is one selected from a group consisting of: a first condition that the region STA5 and the region IA5 are partially overlapping, a second condition that the region STA5 and the region IA5 are entirely overlapping, a third condition that the region STA5 is entirely covering the region IA5, a fourth condition that a geometric centroid of the region STA5 is located within the region IA5, a fifth condition that a centroid of the region IA5 is located within the region STA5, a sixth condition that the trajectory ST5 passes through the region IA5, and a seventh condition that the trajectory ST5 touches the region IA5.

When the region IA5 containing the icons I1 and I2 is circled, as shown in the sub-figure 502, a geometric pattern associated with the selection trajectory ST5 is displayed to mean that the region IA5 has been selected, or the icons I1 and I2 has been selected together, wherein the geometric pattern is, e.g., an ellipse G5 enclosing on the periphery of the region IA5. Afterward, the icons I1 and I2 are caused to change their colors or are displayed into inverse video icons I10 and I20 respectively. Afterward, as shown in the sub-figure 503, a first hand motion M51 or posture is made to the handheld selection device M92, or a pushbutton of the selection device M92 is operated to make a selection from the two inverse-video icons I10 and I20 for deciding the final selected icon, wherein the first hand motion M51 is, e.g., a yaw motion or a roll motion. In an embodiment, as shown in the sub-figure 503, when the inverse-video icon I20 is selected through the first hand motion M51 or posture, a geometric pattern may be displayed for reminding the user the selection status of the current icon, wherein the geometric pattern is, e.g., a circle G51 enclosing the inverse-video icon I20, or an inner circle G52 located within the inverse-video icon I20.

For instance, when it is to be confirmed that the inverse-video icon I20 is to be selected, the user further makes a second hand motion M52 or posture to the selection device M92 for confirming the selection, wherein the second hand motion M52 is, e.g., a movement of drawing a check mark "V". In the mean time, it is confirmed that the icon I2 is selected, and the icon I2 is displayed into the inverse-video icon I20 as shown in the sub-figure 504.

Figure 8:
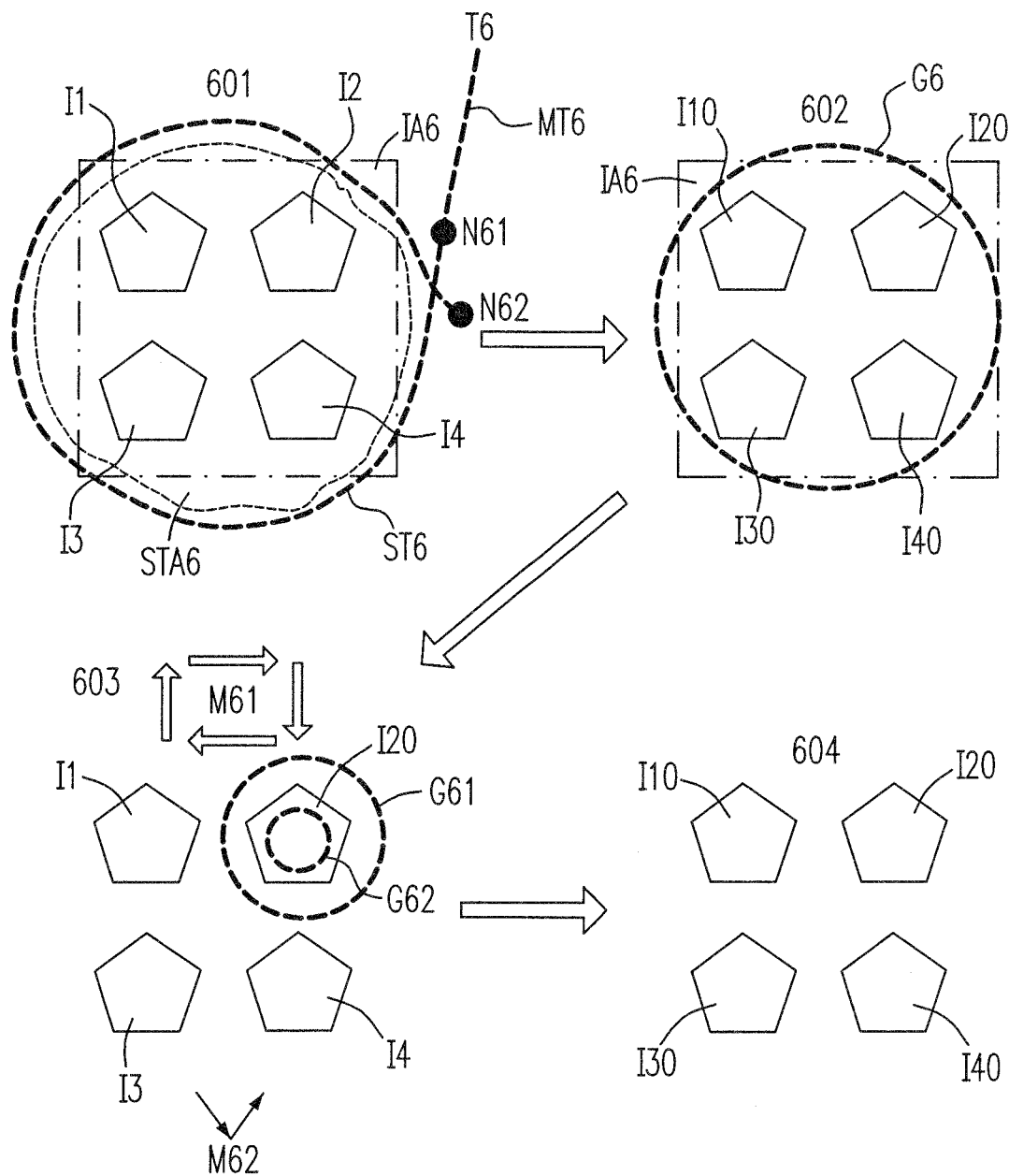
FIG. 8 is a schematic diagram showing the sixth icon selection operation mode for the instruction device and method according to the present invention.

As to the sixth selection operation mode, please refer to FIG. 8, which is an operational schematic diagram showing the sixth icon selection operation mode for the instruction device and method according to the present invention. In the sub-figure 601, a hand (not shown) of a user makes a motion to the selection device M92, shown in FIG. 2, of the present invention, and a trajectory T6 as shown in the sub-figure 601 is displayed on the screen in response to the motion. The trajectory T6 includes a segment of a motion trajectory MT6 and a segment of a selection trajectory ST6. The motion trajectory MT6 is formed in response to a motion of the selection device M92 driven by a hand, wherein the selection device M92 is moved from a first space position, associated with a previous reference point (not shown) on the screen, to a second space position, associated with the start point N61 of the selection trajectory ST6. The selection trajectory ST1 is formed in response to a motion of the selection device M92 driven by the hand when the selection device M92 is used to circle the icons I1, I2, I3 and I4, or when the selection device M92 is used to circle a comparison region IA6 containing the icons I1, I2, I3 and I4.

The selection trajectory ST6 has the selection start point N61 and the selection end point N62, and encloses a region STA6 (the region enclosed by a dash line). The region STA6 is compared with the comparison region IA6 (the region enclosed by a dash-dot line) containing the icons I1, I2, I3 and I4 for deciding whether the icons I1, I2, I3 and I4 are to be selected together. The comparison condition may be one whether the region STA6 intersects the region IA6. When the comparison condition is in a specific condition, it is made the decision that the region IA6 or the icons I1, I2, I3 and I4 in the region IA6 is circled and marked by the selection device M92, wherein the specific condition is one selected from a group consisting of: a first condition that the region STA6 and the region IA6 are partially overlapping, a second condition that the region STA6 and the region IA6 are entirely overlapping, a third condition that the region STA6 is entirely covering the region IA6, a fourth condition that a geometric centroid of the region STA6 is located within the region IA6, a fifth condition that a centroid of the region IA6 is located within the region STA6, a sixth condition that the trajectory ST6 passes through the region IA6, and a seventh condition that the trajectory ST6 touches the region IA6.

When the region IA6 containing the icons I1, I2, I3 and I4 is circled, as shown in the sub-figure 602, a geometric pattern associated with the selection trajectory ST6 is displayed to mean that the region IA6 has been selected, or icons I1, I2, I3 and I4 has been selected together, wherein the geometric pattern is, e.g., a circle G6 enclosing on the periphery of the region IA6. Afterward, the icons I1, I2, I3 and I4 are caused to change their colors or are displayed into inverse video icons I10, I20, I30 and I40 respectively. Afterward, as shown in the sub-figure 603, a first hand motion M61 or posture is made to the handheld selection device M92, or a pushbutton of the selection device M92 is operated to make a selection from the four inverse-video icons I10, I20, I30 and I40 for deciding the final selected icon, wherein the first hand motion M51 is, e.g., a yaw motion, a roll motion or a pitch motion, and the pushbutton is, e.g., a direction pushbutton (not shown). In an embodiment, as shown in the sub-figure 603, when the inverse-video icon I20 is selected through the first motion M61 or posture, a geometric pattern may be displayed for reminding the selection status of the current icon, wherein the geometric pattern is, e.g., a circle G61 enclosing the inverse-video icon I20, or an inner circle G62 located within the inverse-video icon I20.

When it is to be confirmed that the inverse-video icon I20 is to be selected, the user further makes a second hand motion M62 or posture to the selection device M92 for confirming the selection, wherein the second hand motion M62 is, e.g., a movement of drawing a check mark "V". In the mean time, it is confirmed that the icon I2 is selected, the icon I2 is displayed into the inverse-video icon I20, and the other icons I1, I3 and I4 are restored and normally displayed, as shown in the sub-figure 604.

The practical operation schemes are described respectively according to the abovementioned six selection operation modes as follows.

Figure 9A:
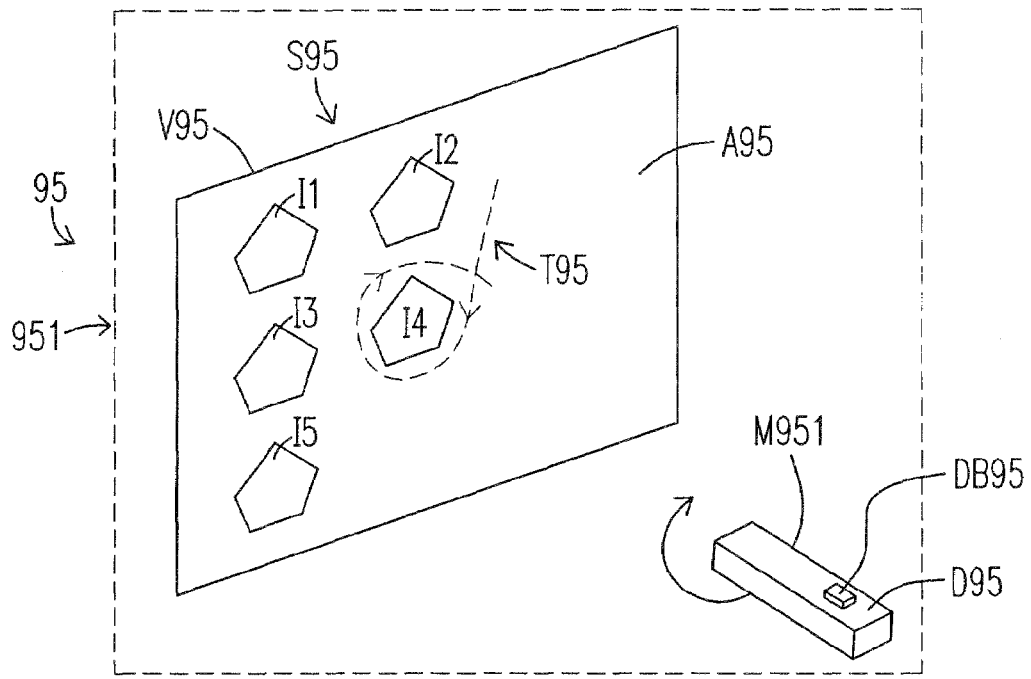
FIG. 9(a) and FIG. 9(b) are schematic diagrams showing the practical operation scheme associated with the first and the second selection operation modes according to the present invention.
Figure 9B:
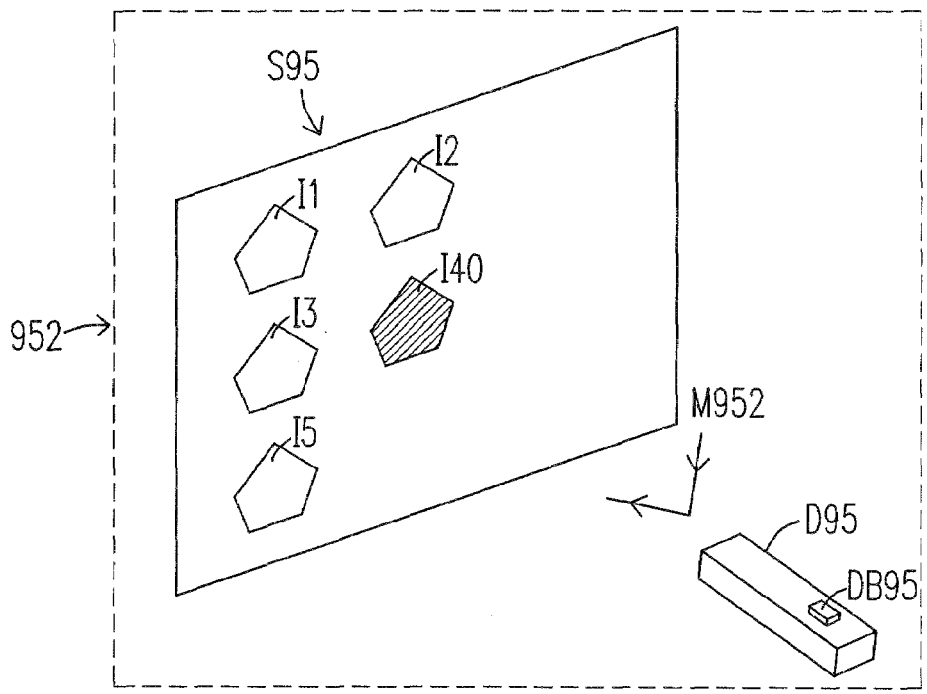

As to the practical operation scheme associated with the first or the second selection operation mode shown in FIG. 3 and FIG. 4 respectively, please refer to FIG. 9(a) and FIG. 9(b), which are schematic diagrams showing the practical operation scheme 95 associated with the first and the second selection operation modes according to the present invention. A selection configuration 951 for the practical operation scheme 95 is shown in FIG. 9(a), and includes a display system S95 and a selection device D95. The display system S95 includes a display device V95. The display device V95 has a display area A95, image icons I1, I2, I3, I4 and I5 are displayed in the display area A95. The selection device D95 senses a hand motion M951. A circled trajectory T95 is displayed on the display area A95 in response to the hand motion M951, and encloses the icon I4.

Please refer to FIG. 9(b), which shows a selection configuration 952 for the practical operation scheme 95. The comparison condition provided in the first or the second selection operation mode is considered. When the first or the second selection operation mode confirms that the icon I4 is to be selected, the selected icon I4 is caused to change its color or is displayed into an inverse video icon I40 thereof for confirming the success of circling the icon I4. That is to say, the inverse video icon I40 is a presentation that confirms that the icon I4 is selected.

After a selected status of the icon I4 is confirmed, the selection device D95 may communicate a message to the display system S95 by a specific operation for performing a function of the icon I4, wherein the specific operation is one selected from a group consisting of: a first operation of sensing a hand motion M952, and a second operation of pressing a pushbutton DB95 of the selection device D95 disposed thereon.

Figure 10A:
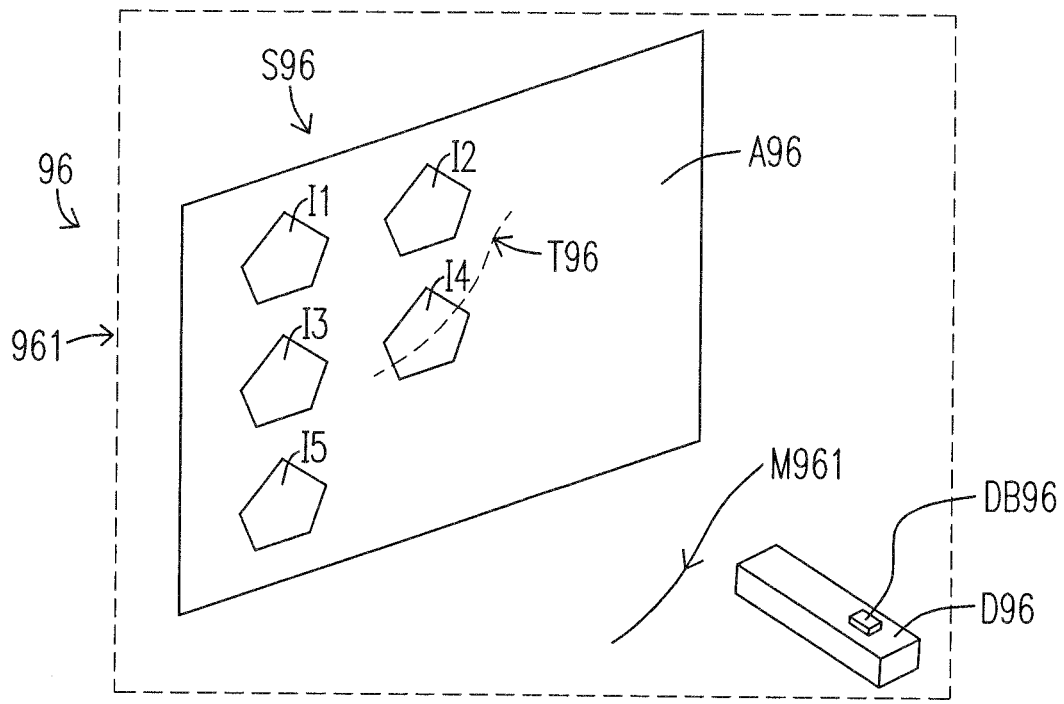
FIG. 10(a) and FIG. 10(b) are schematic diagrams showing the practical operation scheme associated with the third selection operation modes according to the present invention.
Figure 10B:
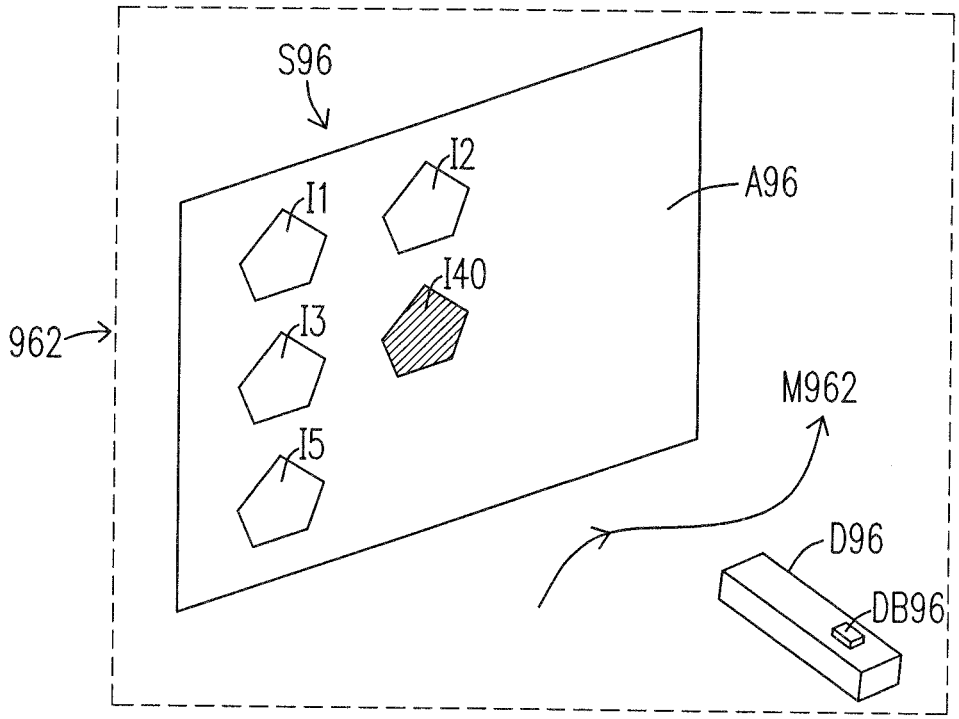

As to the practical operation scheme associated with the third selection operation mode shown in FIG. 5, please refer to FIG. 10(a) and FIG. 10(b), which are schematic diagrams showing the practical operation scheme 96 associated with the third selection operation mode according to the present invention. A selection configuration 961 for the practical operation scheme 96 is shown in FIG. 10(a), and includes a display system S96 and a selection device D96. The display system S96 includes a display area A96, and image icons I1, I2, I3, I4 and I5 are displayed in the display area A96. The selection device D96 senses a hand motion M961. A selection trajectory T96 is displayed on the display area A96 in response to the hand motion M961, and passes through the icon I4.

Please refer to FIG. 10(b), which shows a selection configuration 962 for the practical operation scheme 96. The comparison condition provided in the third selection operation mode is considered. When the third selection operation mode confirms that the icon I4 is to be selected, the selected icon I4 is caused to change its color or is displayed into an inverse video icon I40 thereof for confirming the success of circling the icon I4. That is to say, the inverse video icon I40 is a presentation that confirms that the icon I4 is selected.

After a selected status of the icon I4 is confirmed, the selection device D96 may communicate a message to the display system S96 by a specific operation for performing a function of the icon I4, wherein the specific operation is one selected from a group consisting of: a first operation of sensing a hand motion M962, and a second operation of pressing a pushbutton DB96 of the selection device D96 disposed thereon.

Figure 11A:
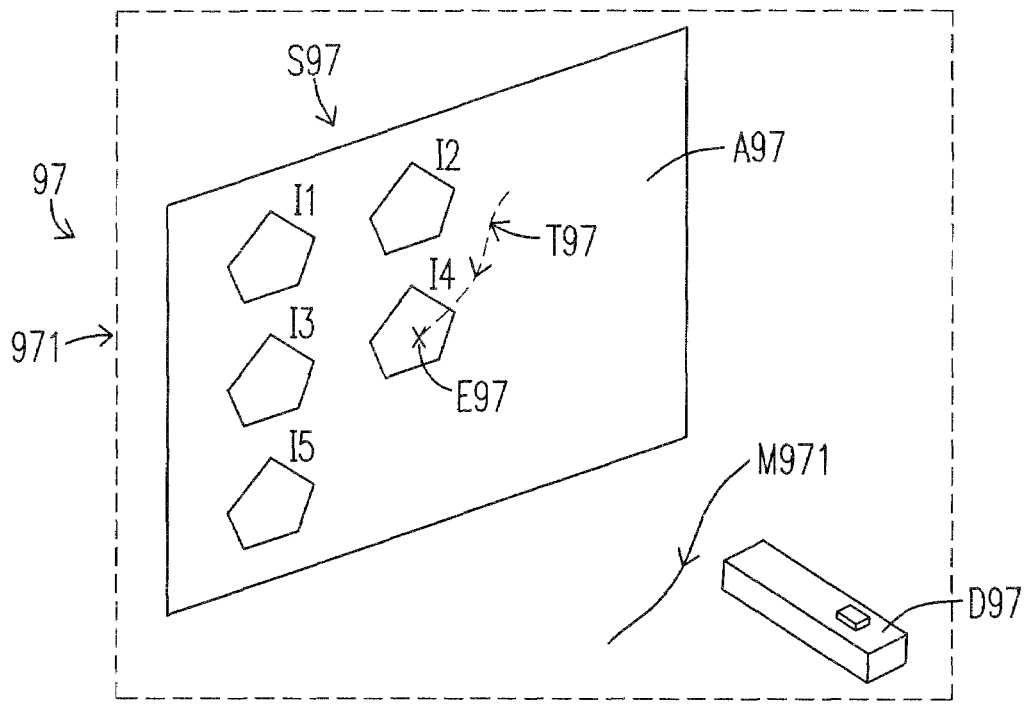
FIG. 11(a) and FIG. 11(b) are schematic diagrams showing the practical operation scheme associated with the fourth selection operation modes according to the present invention.
Figure 11B:
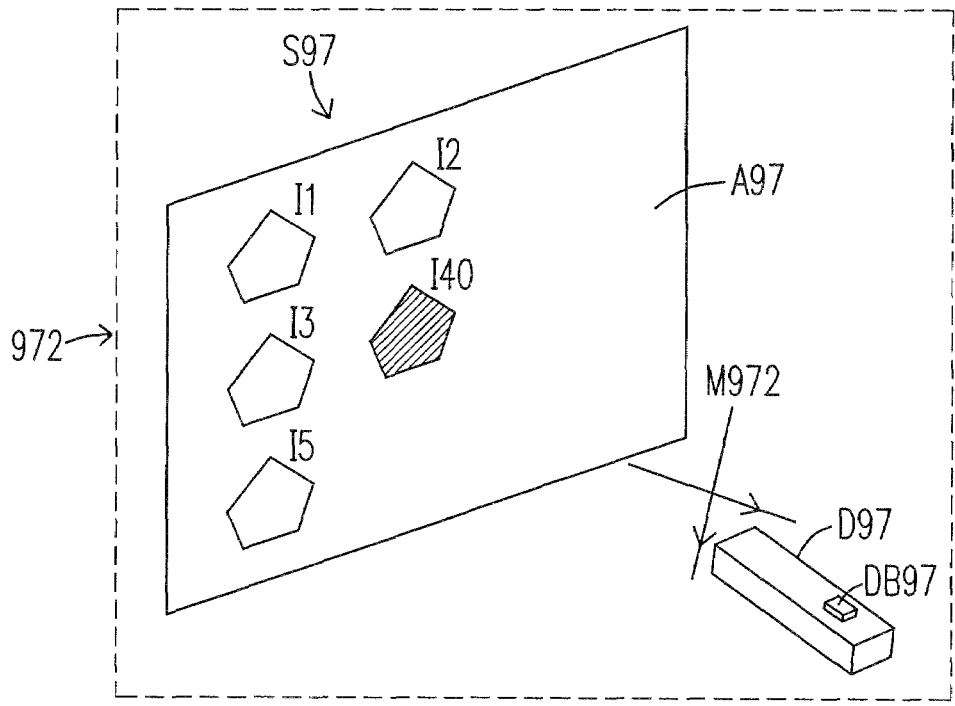

As to the practical operation scheme associated with the fourth selection operation mode shown in FIG. 6, please refer to FIG. 11(a) and FIG. 11(b), which are schematic diagrams showing the practical operation scheme 97 associated with the fourth selection operation mode according to the present invention. A selection configuration 971 for the practical operation scheme 97 is shown in FIG. 11(a), and includes a display system S97 and a selection device D97. The display system S97 includes a display area A97, and image icons I1, I2, I3, I4 and I5 are displayed in the display area A97. The selection device D97 senses a hand motion M971. A selection trajectory T97 is displayed on the display area A97 in response to the hand motion M971, and an end point E97 of the selection trajectory T97 is located in the region of the icon I4.

Please refer to FIG. 11(b), which shows a selection configuration 972 for the practical operation scheme 97. The comparison condition provided in the fourth selection operation mode is considered. When the fourth selection operation mode confirms that the icon I4 is to be selected, the selected icon I4 is caused to change its color or is displayed into an inverse video icon I40 thereof for confirming the success of circling the icon I4. That is to say, the inverse video icon I40 is a presentation that confirms that the icon I4 is selected.

After a selected status of the icon I4 is confirmed, if the user wants to cancel the selected status of the icon I4 and make the inverse video icon I40 or the color-changed icon be restored into the unselected state of the icon I4, the selection device D96 may communicate a message to the display system S97 by a specific operation for canceling the inverse video icon I40 and making it restored into the icon I4, wherein the specific operation is one selected from a group consisting of: a first operation of moving to draw a letter "X", and a second operation of pressing a pushbutton DB97 of the selection device D97 disposed thereon.

Figure 12A:
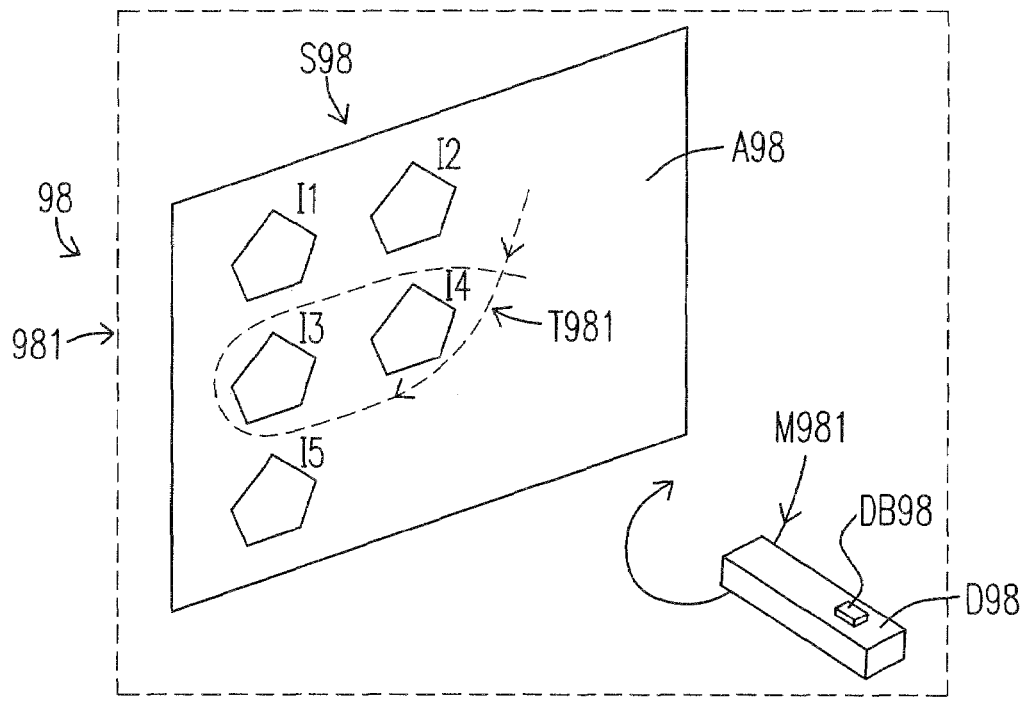
FIG. 12(a), FIG. 12(b), FIG. 12(c), and FIG. 12(d) are schematic diagrams showing the practical operation scheme associated with the fifth selection operation modes according to the present invention.

As to the practical operation scheme associated with the fifth selection operation mode shown in FIG. 7, please refer to FIG. 12(a), FIG. 12(b), FIG. 12(c) and FIG. 12(d), which are schematic diagrams showing the practical operation scheme 98 associated with the fifth selection operation mode according to the present invention. A selection configuration 981 for the practical operation scheme 98 is shown in FIG. 12(a). The selection configuration 981 includes a display system S98 and a selection device D98. The display system S98 includes a display area A98, and image icons I1, I2, I3, I4 and I5 are displayed in the display area A98. The selection device D98 senses a hand motion M981. A selection trajectory T981 is displayed on the display area A98 in response to the hand motion M981, and encloses the icons I3 and I4, which are discretely displayed on the display area A98. The comparison condition provided in the fifth selection operation mode is considered for deciding one of the icons I3 and I4 to be the final selected icon.

Figure 12B:
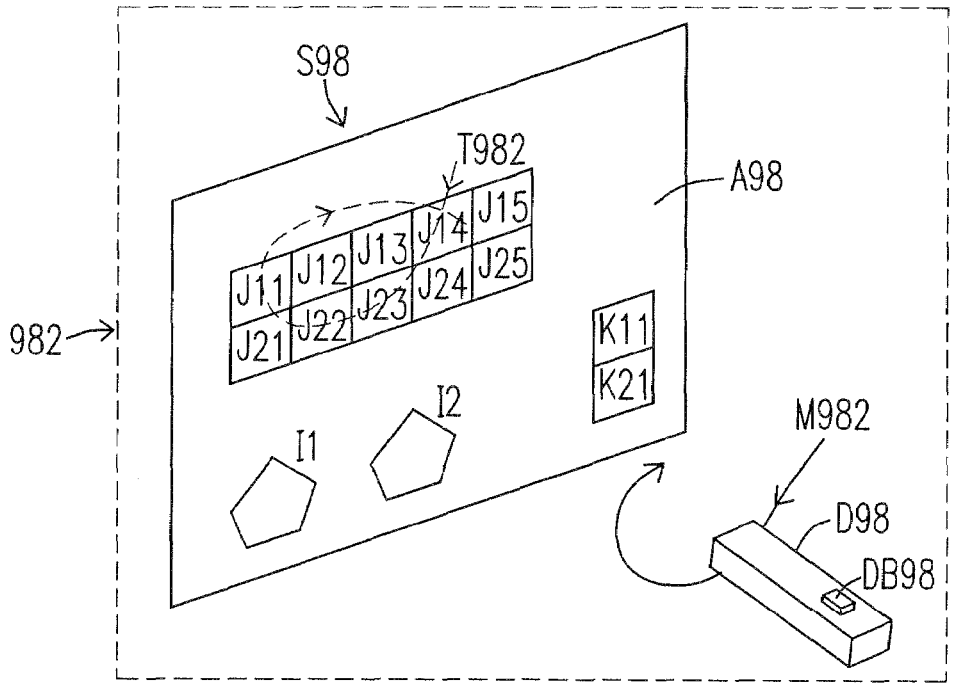
Figure 12C:
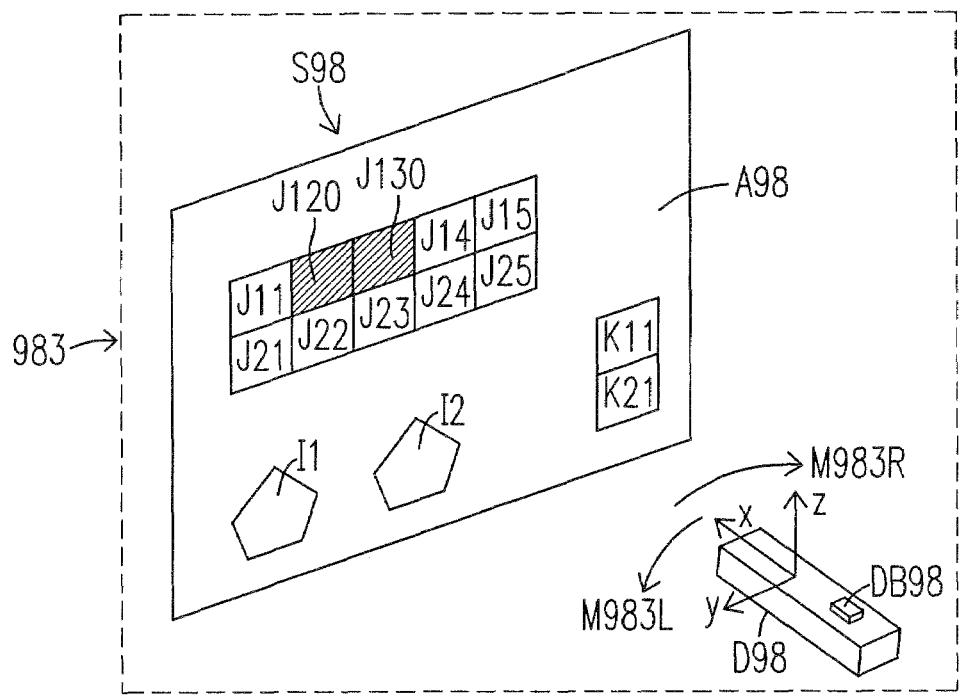

Please refer to FIG. 12(b), which shows a selection configuration 982 for the practical operation scheme 98 associated with the fifth selection operation mode. The selection configuration 982 includes a display system S98 and a selection device D98. The display system S98 includes a display area A98. Adjoining image icons J11, J12, J13, J14, J15, J21, J22, J23, J24 and J25 sequentially arranged, discrete image icons I1 and I2 independently arranged, and adjoining image icons K11 and K12 arranged in pair are displayed in the display area A98. The selection device D98 senses a hand motion M982. A selection trajectory T982 is displayed on the display area A98 in response to the hand motion M982, and encloses the adjoining icons J12 and J13 displayed on the display area A98. Please refer to FIG. 12(c), which shows a selection configuration 983 for the practical operation scheme 98. The selected icons J12 and J13 are caused to change their colors or are displayed into inverse video icons J120 and J130 respectively for showing that the icons J12 and J13 are the candidate objects to be further selected.

In the selection configuration 983, the selection device D98 senses a selection motion for further making a selection from the inverse video icons J120 and J130 of the candidate objects, wherein the selection motion is, e.g., a yaw motion M983 including a left yaw motion M983L and a right yaw motion M983R, and the yaw motion M983 rotates around the z axis of the selection device D98. The further selection operation may be performed with the motion M983L or the motion M983R, and the brightness or the color of the inverse video icon J120 can be different from that of the inverse video icon J130 for prompting the user the current selection status.

Figure 12D:
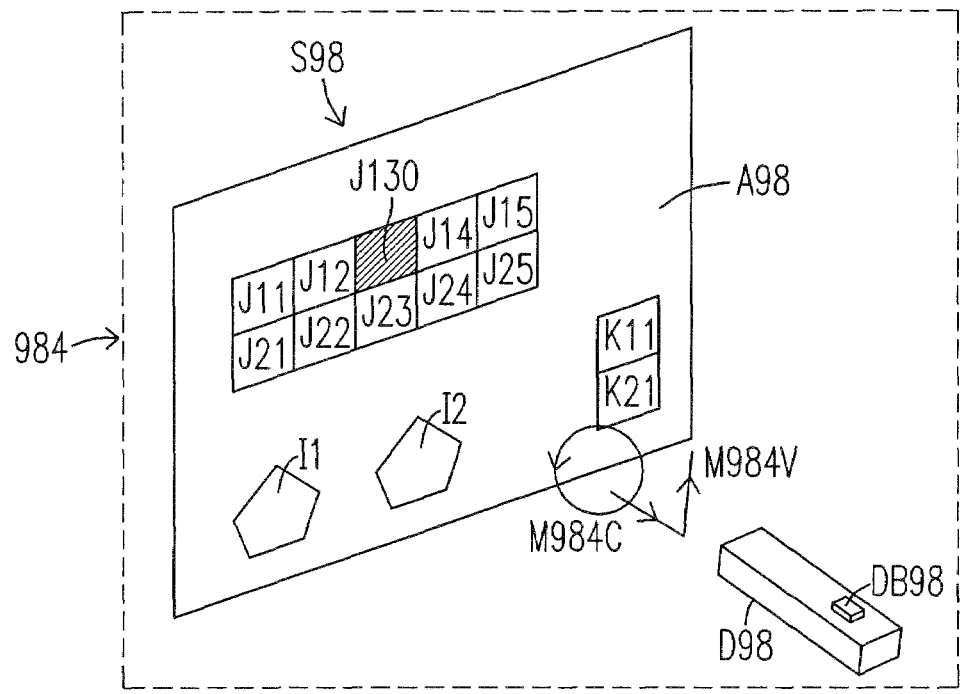

Please refer to FIG. 12(d), which shows a selection configuration 984 for the practical operation scheme 98. When one of the icons J120 and J130 having brightness or a color different from that of the other is the final selection target, the selection device D98 may communicate a confirmation message to the display system S98 by a specific operation of the selection device D98 for confirming that the final selected icon is one the icons J120 and J130 being in a inverse-video state, wherein the specific operation is one selected from a group consisting of: a first operation of sensing a circling motion M984C, and a second operation of pressing a pushbutton DB98 of the selection device D98 disposed thereon.

For instance, under the condition that the icon J130 being in the inverse-video state of the icon J13 is confirmed to be the final selected object, when the selection device D98 senses a function starting motion, such as a check mark "V" motion M984V, the function of the icon J13 may be performed.

As to the practical operation scheme associated with the sixth selection operation mode shown in FIG. 8, please refer to FIG. 13(a), FIG. 13(b), FIG. 13(c) and FIG. 13(d), which are schematic diagrams showing the practical operation scheme 99 associated with the sixth selection operation mode according to the present invention. A selection configuration 991 for the practical operation scheme 99 is shown in FIG. 12(a). The selection configuration 991 includes a display system S99 and a selection device D99. The display system S99 includes a display area A99, and image icons I1, I2, I3, I4 and I5 are displayed in the display area A99. The selection device D99 senses a hand motion M991. A selection trajectory T991 is displayed on the display area A99 in response to the hand motion M991, and encloses the icons I1, I2, I3 and I4, which are discretely displayed on the display area A99. The comparison condition provided in the sixth selection operation mode is considered for deciding one of the icons I1, I2, I3 and I4 to be the final selected icon.

Figure 13A:
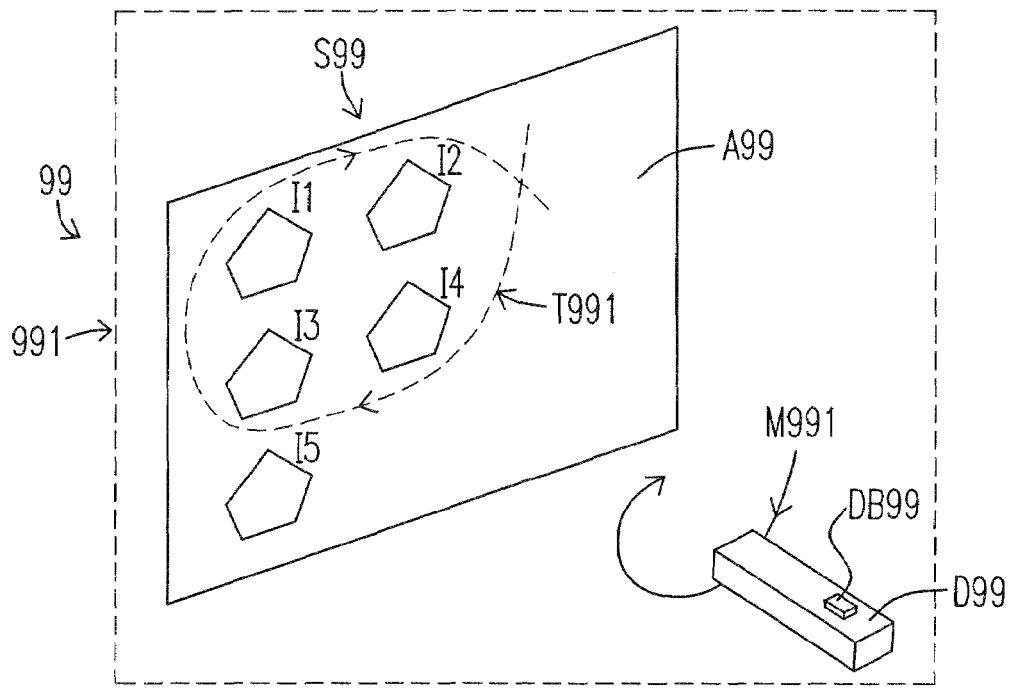
FIG. 13(a), FIG. 13(b), FIG. 13(c), and FIG. 13(d) are schematic diagrams showing the practical operation scheme associated with the fifth selection operation modes according to the present invention.
Figure 13B:
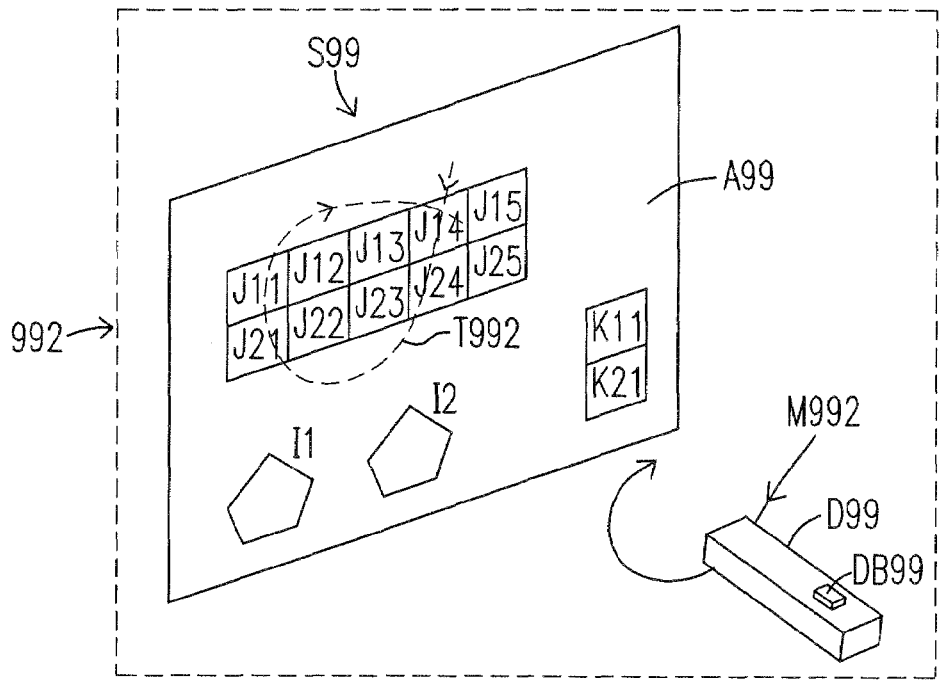
Figure 13C:
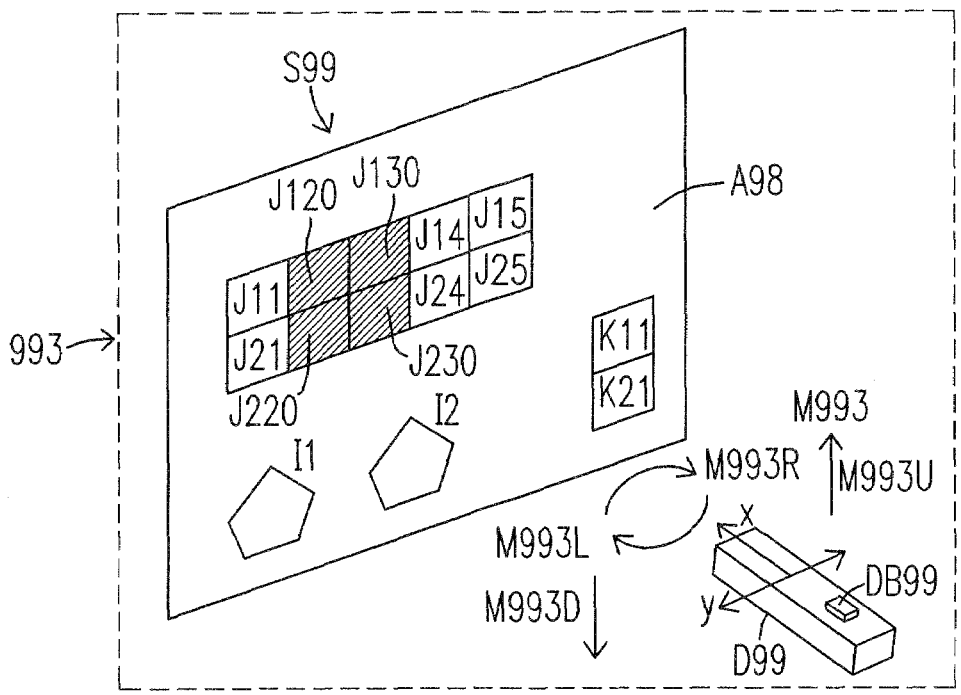
Figure 13D:
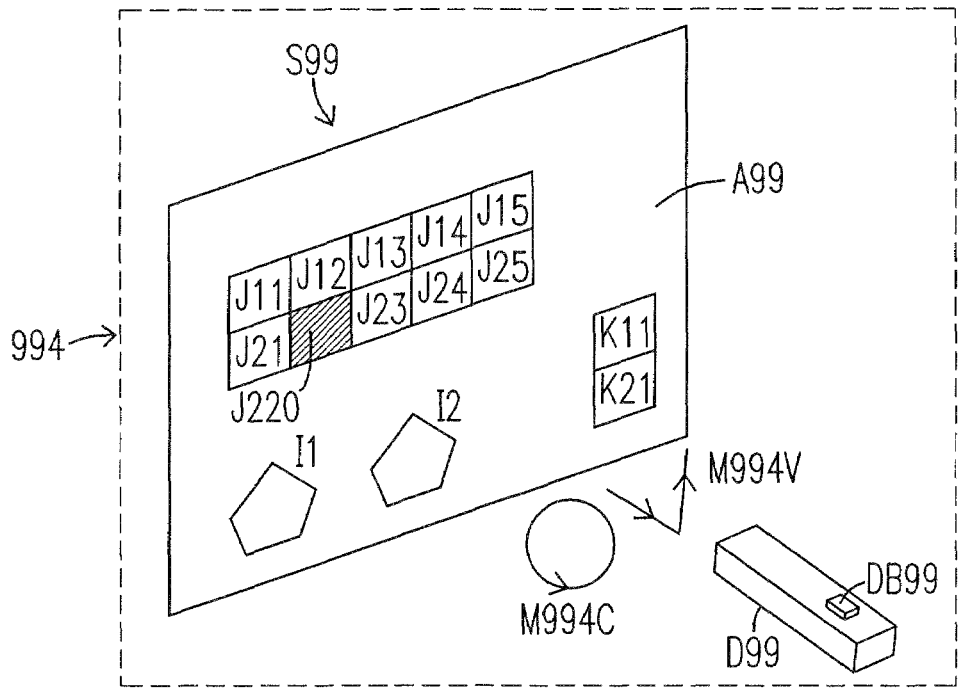

Please refer to FIG. 13(b), which shows a selection configuration 992 for the practical operation scheme 99 associated with the sixth selection operation mode. The selection configuration 992 includes a display system S99 and a selection device D99. The display system S99 includes a display area A99. In the display area A99, there are image icons I1 and I2 having a spacing therebetween, an array of image icons J11, J12, J13, J14, J15, J21, J22, J23, J24 and J25 without a spacing therebetween, and adjoining image icons K11 and K12. The selection device D99 senses a hand motion M992. A selection trajectory T992 is displayed on the display area A99 in response to the hand motion M992, and encloses the adjoining icons J12, J13, J22 and J23 displayed on the display area A98. Please refer to FIG. 13(c), which shows a selection configuration 993 for the practical operation scheme 99. The selected icons J12, J13, J22 and J23 are caused to change their colors or are displayed into inverse video icons J120, J130, J220 and J230 respectively for showing that the icons J12, J13, J22 and J23 are the candidate objects to be further selected.

In the selection configuration 993, the selection device D99 senses a selection motion M993 for further making a selection from the inverse video icons J120, J130, J220 and J230 of the candidate objects, wherein the selection motion M993 includes a counterclockwise roll motion M993L and a clockwise roll motion M993R both rotating around the x axis of the selection device D99, a pitch-up motion M993U and a pitch-down motion M993D. Under the condition that the motions M993L, M993R, M993U and M993D is used to perform the further selection operation, when one of the inverse video icons J120, J130, J220 and J230, such as the inverse video icons J220, is further selected, the brightness or the color of the one is changed to be different from that of the inverse video icon J120, J130 or J230 for prompting the user the current selection status.

Please refer to FIG. 12(d), which shows a selection configuration 994 for the practical operation scheme 99. When the icon J220 having the different brightness or color is the final selection target, the selection device D99 may communicate a confirmation message to the display system S99 by a specific operation of the selection device D99 for confirming that the final selected icon is the icon J220 being in a inverse-video state, wherein the specific operation is one selected from a group consisting of: a first operation of sensing a circling motion M994C, and a second operation of pressing a pushbutton DB99 of the selection device D98 disposed thereon.

For instance, under the condition that the icon J220 being in the inverse-video state of the icon J22 is confirmed to be the final selected object, when the selection device D99 senses a function starting motion, such as a check mark "V" motion M994V, the function of the icon J22 may be performed.

Figure 14:
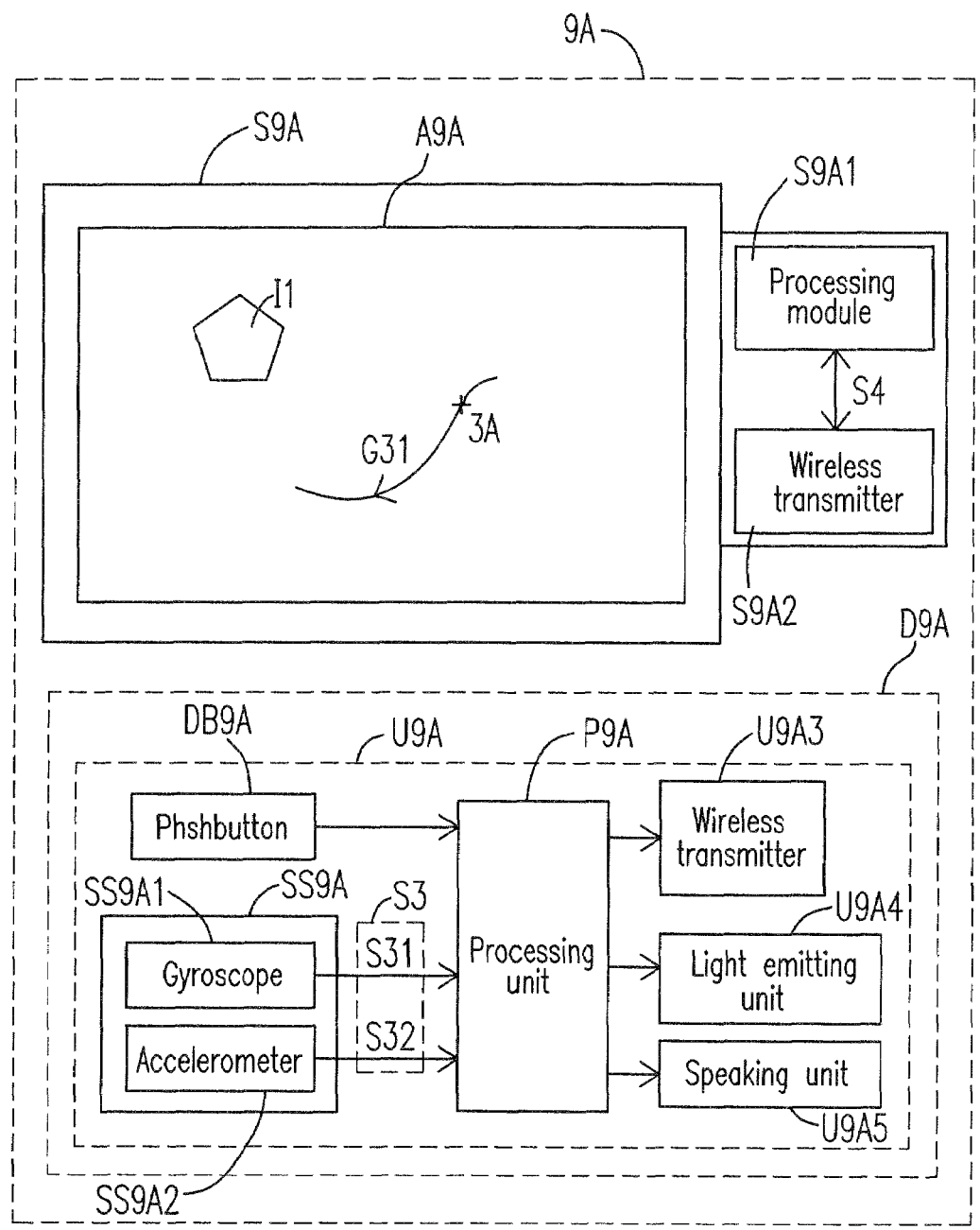
FIG. 14 is a schematic diagram showing a system architecture of an instruction device having the function feeding the icon selection status back to the user according to the present invention.

Please refer to FIG. 14, which is a schematic diagram showing a system architecture of an instruction device having the function feeding the icon selection status back to the user according to the present invention. As shown, the selection system 9A includes a display system S9A and a selection device D9A. The display system S9A has a display area A9A capable of displaying an image. The image may be an icon. There is a definable position 3A in the display area A9A, wherein the definable position 3A may be defined to any position in the display area A9A.

The selection device D9A includes a selection unit U9A. The selection unit U9A includes a pushbutton DB9A, a motion sensing unit SS9A, a processing unit P9A, a wireless transmitter U9A3, a light emitting unit U9A4 and a speaking unit U9A5. Each of the pushbutton DB9A, the motion sensing unit SS9A, the wireless transmitter U9A3, the light emitting unit U9A4 and the speaking unit U9A5 is coupled to the processing unit P9A.

The motion sensing unit SS9A has the ability to sense a three-dimensional (x, y, z) motion and provides a signal S3 to the processing unit P9A. The motion sensing unit SS9A at least includes a gyroscope SS9A1 and/or an accelerometer SS9A2, wherein either the gyroscope SS9A1 or the accelerometer SS9A2 may have one, two or three independent sensing degree(s) of freedom. The gyroscope SS9A1 and the accelerometer SS9A2 provide a sub-signal S31 and a sub-signal S32 of the signal S3 respectively to the processing unit P9A.

The display system S9A further includes a processing module S9A1 and a wireless transmitter S9A2. The processing unit P9A uses the wireless transmitter U9A3 to transmit the signal S3 to the wireless transmitter S9A2 of the display system S9A, wherein the signal S3 is processed or is not processed by the processing unit P9A into a signal S4. The wireless transmitter S9A2 receives the signal S4 having information. The information associated with the signal S3 are processed by the processing module S9A1 of the display system S9A. The motion (not shown) sensed by the sensing unit SS9A is transformed into a trajectory G31 displayed on the display area A9A; i.e., the trajectory G31 corresponds to the motion through the processing module S9A1. Afterward, when a specific relationship between the trajectory G31 and the icon I1 is satisfied, the selected status of the icon I1 is confirmed. Thus, the processing module S9A1 can cause the circled icon I1 to change the color of the icon I1, e.g., displayed with the inverse video or flicking. Otherwise, in the mean time, the processing module S9A1 can use the wireless transmitter S9A2 to send a selection indication signal to the wireless transmitter U9A3. The wireless transmitter U9A3 receives the selection indication signal. In response to the selection indication signal, the processing unit P9A sends out an interactive signal, which causes the light emitting unit U9A4 to generate a light wave or causes the speaking unit U9A4 to generate a sound wave.

That is to say, the abovementioned operation can cause the computer (not shown), the display system S9A or the selection unit U9A itself to generate an acoustic wave, a light wave, a force feedback or a vibration wave, which is used to remind the user the selection status of the icon I1 or the icon I1 has been selected, wherein the selection unit U9A is electrically coupled to the computer or the display system S9A. Therefore, the abovementioned operation may cause the actions among the user, the selection device, and the icon or the electronic menu to be interactive.

Figure 15:
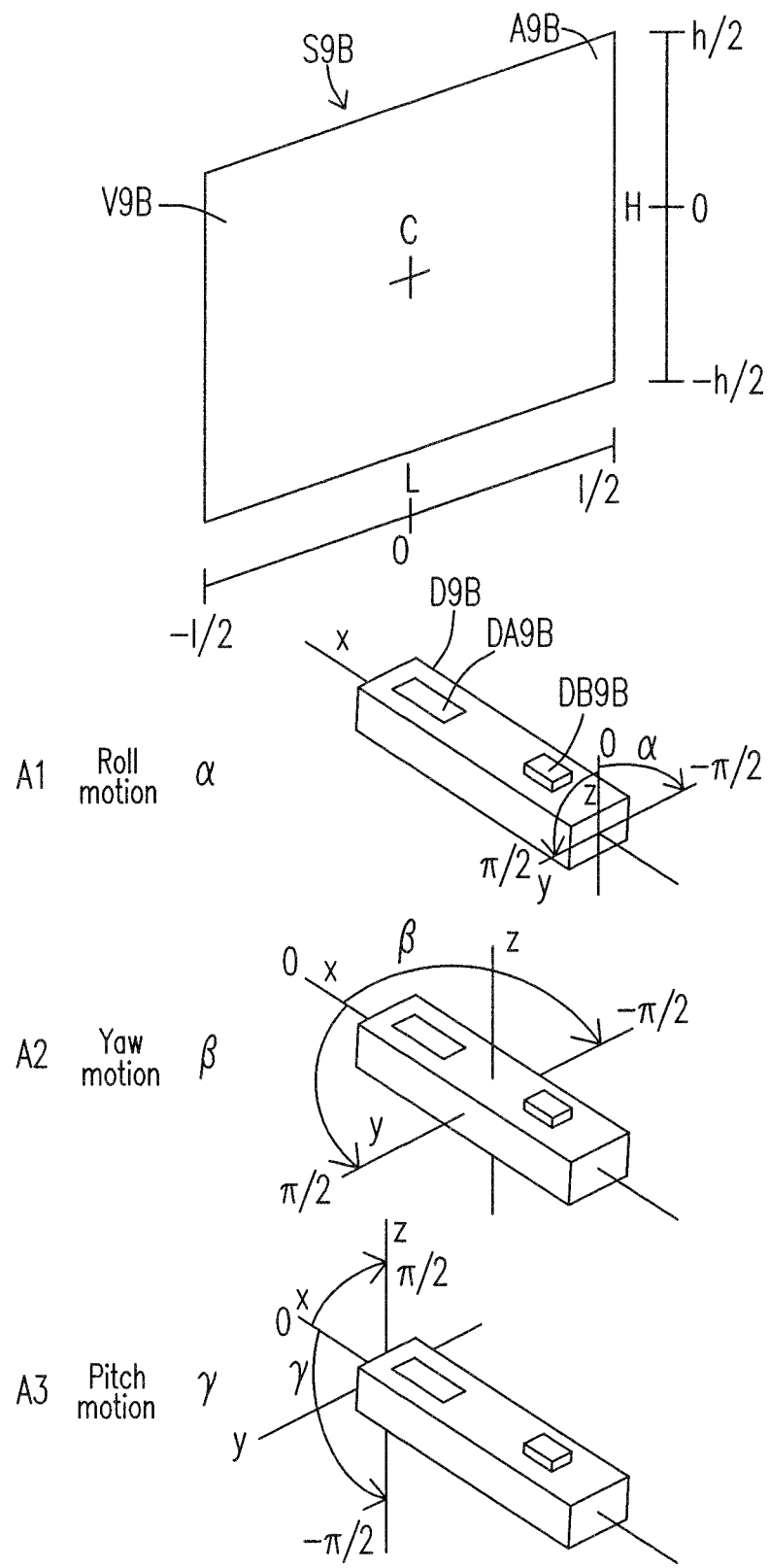
FIG. 15 is a schematic diagram showing a correlation between the operation angle range of the selection unit of the instruction device and the display area range of the display system according to the present invention.

As to the correlation between the operation motion and the associated positions displayed on the screen, please refer to FIG. 15, which is a schematic diagram showing a correlation between the operation angle range of the selection unit of the instruction device and the display area range of the display system according to the present invention. As shown, the display system S9B includes a display device V9B. The display device V9B includes a display area A9B having a length L and a width H. There is a center point C in the display area A9B. The length L and the width H of the display area A9B is denoted into $(-L/2, L/2)$ and $(-h/2, h/2)$ respectively according to the center point C.

The sub-figures A1 and A2 schematically show the operation angle configurations for the roll angle α and the yaw angle β. The correlation between the angle definition area of either the roll angle α or the yaw angle β and the definition area of the length L of the display area A9B may be expressed as follows:

$$\alpha \subset (\alpha L, \alpha S) \rightarrow L \subset (-\frac{1}{2}, \frac{1}{2})$$

$$\beta \subset (\beta L, \beta S) \rightarrow L \subset (-\frac{1}{2}, \frac{1}{2})$$

wherein, αS, αL and βS, βL may be arbitrarily set, e.g. let αS=βS>=−π/2; αL=βL<=π/2.

The sub-figure A3 schematically shows the operation angle configuration for the pitch angle γ. The correlation between the angle definition area of the pitch angle γ and the definition area of the width W of the display area A9B may be expressed as follows:

$$\gamma \subset (\gamma S, \gamma L) \rightarrow H \subset (-h/2, h/2)$$

wherein, γS, γL may be arbitrarily set, e.g. let γS>=−π/2; γL<=π/2.

In an embodiment of obtaining the value of the actual angle, the gyroscope may be used to measure the abovementioned yaw angle β, and the accelerometer or the gyroscope may be used to measure the roll angle α or the yaw angle β. The selection device includes a pushbutton DB9B and a display panel DA9B.

Besides, the center point C may be served as an absolute position reference point for the function that the motion to be sensed corresponds to the trajectory in the display area A9B. The scheme for starting the correlation is described as follows. The selection device D9B is held in a hand, and the power (not shown) thereof is turned on. The pushbutton DB9B is pressed and the selection device D9B is operated to make one cycle consisting of an up-down pitch motion, a left-right yaw motion and a clockwise-counterclockwise roll motion. Afterward, the selection device D9B sends the roll initialization angle, the yaw initialization angle and the pitch initialization angle, which are read by the accelerometer and the gyroscope, to the display system S9B, and these initialization angles are displayed on the display area A9B of the display system S9B.

Of course, these initialization angles may be displayed on the display panel DA9B disposed on the selection device D9B for reminding the user the values of the three initialization angles when the selection device D9B begins to be used. Then, the display system S9B or the selection device D9B further reset these initialization angle values to zero, so that the operation relationship between the zero initialization angle values, of the three operation angles in the selection system, and the initialization posture of the selection device D9B is established. Afterward, the trajectory, corresponding to the motion and displayed on the display area A9B, has a start point referred to the center point C of the display area A9B serving as the absolute reference point.

As to the operation scheme for the actual initialization posture of the selection device and the initialization setup of the relative reference point of the display area, please refer to FIG. 16, which shows an initialization correlation between the operation posture of the selection unit of the instruction device and the absolute reference coordinate of the center point or the relative reference coordinate of any point in the display area according to the present invention.

Figure 16A:
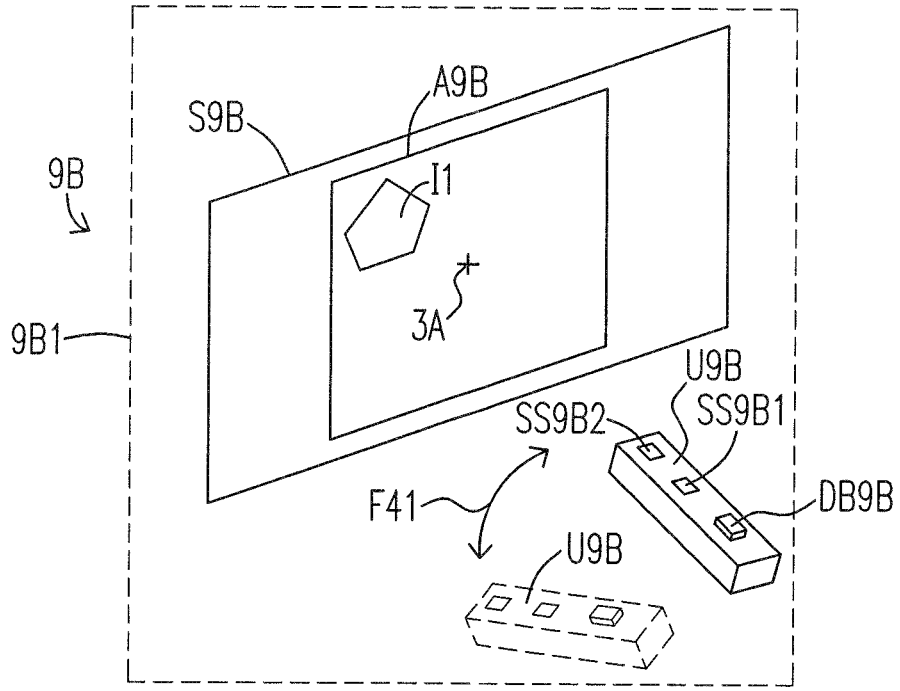
FIG. 16(a) and FIG. 16(b) are schematic diagrams showing an initialization correlation between the operation posture of the selection unit of the instruction device and the absolute reference coordinate of the center point or the relative reference coordinate of any point in the display area according to the present invention.
Figure 16B:
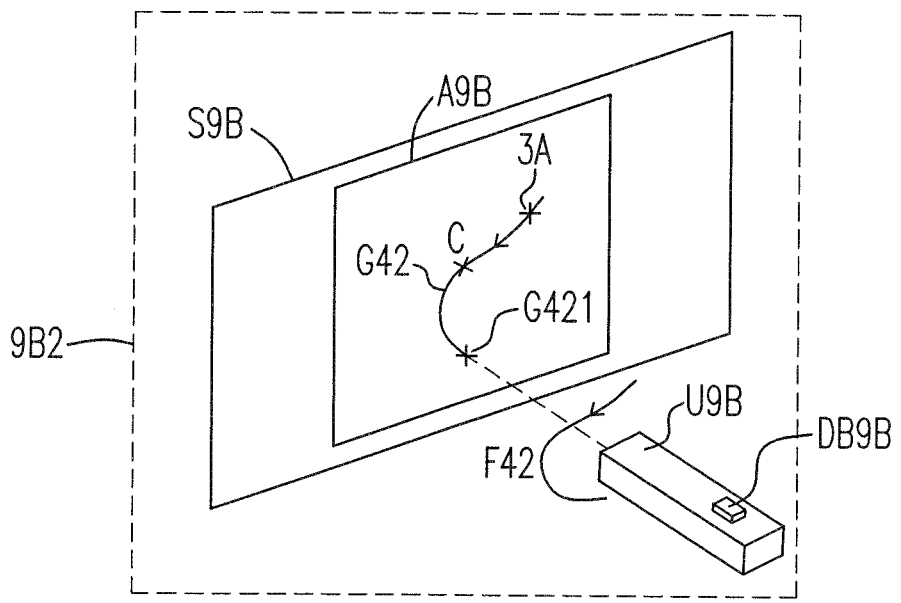

FIG. 16(a) and FIG. 16(b) are schematic diagrams showing the initialization configurations 9B1 and 9B2 of the selection system 9B respectively. As shown in FIG. 16(a), in order to initialize the motion sensing or start the motion sensing, the pushbutton DB9A of the selection unit U9B may be pressed to start sensing, or a specific movement is used to start sensing. The gyroscope SS9B1 or the accelerometer SS9B2 a may be used to recognize the specific movement through the analysis of the acceleration-deceleration distribution thereof for starting the sensing function. For instance, an up-down pitch motion F41 is used to start the motion sensing function of the selection unit U9B.

As shown in FIG. 16(b), after the motion sensing function of the selection unit U9B is started, the center point C of the image area A9B corresponds to a start point of a trajectory G42, wherein the trajectory is displayed in response to the motion F42 of the selection unit U9B. The absolute coordinate of any reference point G421 on the trajectory G42 may be read by pressing the pushbutton DB9A, and the selection unit U9B may consider the reference point G421 as a new relative reference point, which serves as a start position reference point of a trajectory corresponding to the next motion.

Figure 17:
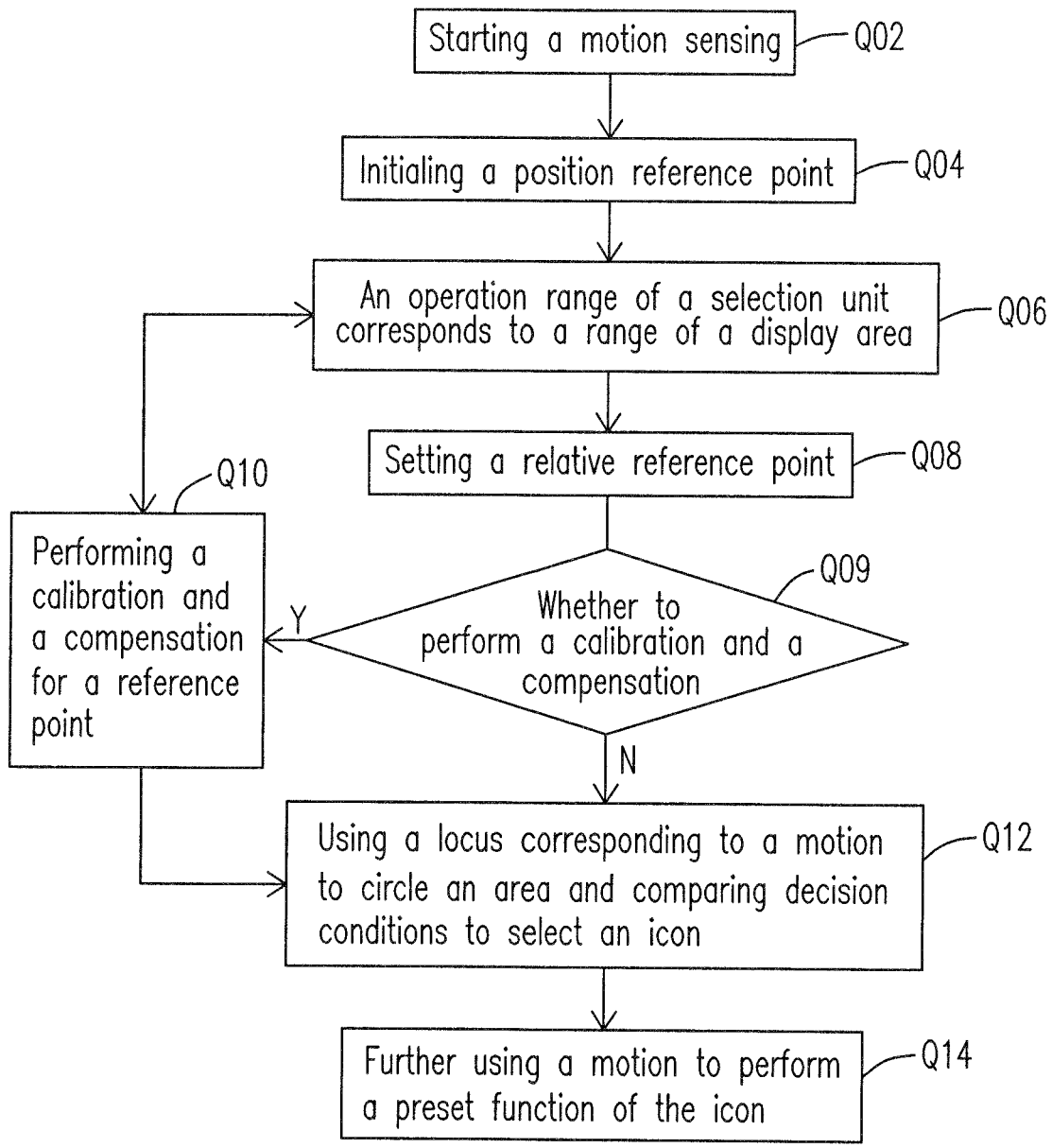
FIG. 17 is a flow diagram showing an operation of the selection system for the instruction device and method according to the present invention.

The flow diagram for the icon selection operation:

Please refer to FIG. 17, which is a flow diagram showing an operation of the selection system 9B for the instruction device and method according to the present invention. As shown in Step Q06, the operation range of the selection unit 37 corresponds to the range of the display area A9B for correlating any definable position 3A in the display area A9B with a posture of the motion of the selection unit U9B. In Step Q02, a motion sensing starts. In Step Q04, the selection device and the center point C of the display area are initialized to define an absolute reference point. If necessary, Step Q08 is performed to define a relative reference point. For instance, a point on the trajectory G42 is defined as a start position reference point G421 of a new trajectory, wherein the new trajectory corresponds to the next movement. In the Step Q09, it is decided whether to perform a calibration and a compensation. If the decision result is true, the flow proceeds to Step Q10. If the decision result is false, the flow proceeds to Step Q12. In Step Q10, a calibration and a compensation of the reference point G421 are performed. In Step Q12, the associated operation conditions are compared based on the employed icon selection operation mode. In Step Q14, the motion M994V as shown in FIG. 14(b) is used to cause a preset function of the icon I1 to be performed.

Embodiments

1. An instruction device for communicating an instruction and a first reaction medium, comprising:

a sensing unit sensing a first instruction medium to generate a corresponding first signal; and a responding unit generating a geometric reference in response to the corresponding first signal for a decision whether a communication between the instruction and the first reaction medium shall be conducted according to a relationship between the geometric reference and the first reaction medium.

2. The instruction device of embodiment 1, wherein the communication is transmitting the instruction to the first reaction medium.

3. The instruction device of embodiment 1 wherein the communication is conducted by causing the first reaction medium to be operated.

4. The instruction device of embodiment 1 wherein the communication is transmitting a feedback signal by the first reaction medium to the sensing unit.

5. The instruction device of embodiment 1 wherein the first reaction medium is disposed in a specific area.

6. The instruction device of embodiment 5 wherein the specific area is disposed on one selected from a group consisting of screen, monitor, and display.

7. The instruction device of embodiment 5 wherein the geometric reference includes at least two reference positions, and the relationship is a first relationship between the at least two reference positions and the first reaction medium.

8. The instruction device of embodiment 7 wherein the two positional references form a geometrical line.

9. The instruction device of embodiment 5 wherein the geometric reference includes at least three reference positions for the decision whether the communication between the instruction and the first reaction medium shall be conducted according to a the relationship being a first relationship between a first region in the specific area commonly formed by the at least three reference positions and a second region in the specific area where the first reaction medium is located.

10. The instruction device of embodiment 9 wherein the second region further comprises a second reaction medium near the first reaction medium.

11. The instruction device of embodiment 9 wherein the instruction medium is a motion and the sensing unit is a motion sensing unit.

12. The instruction device of embodiment 9 wherein the first relationship is a positional relationship and the first reaction medium is an icon.

13. The instruction device of embodiment 9 wherein the corresponding first signal produces a trajectory which describes the first region.

14. An instruction device for communicating an instruction and an icon in an image area, comprising:
a motion sensing unit sensing a first motion to generate a corresponding first signal; and
a processing unit generating a first trajectory to determine a first region in the image area in response to the corresponding first region for a decision whether the icon shall be or has been selected according to a relationship between the first region and a second region where the icon is displayed in the image area.

15. The instruction device of embodiment 14, wherein the instruction is a selection instruction.

16. The instruction device of embodiment 14, wherein the processing unit further transforms the corresponding first signal into the first trajectory.

17. The instruction device of embodiment 14, wherein:
the first trajectory includes at least one selected from a group consisting of a first arc having an arc angle, a combination of a second arc and a first line segment, and plural second line segments; and
the arc angle of the first arc is in a degree being one selected from a group consisting of 180°, and beyond 180° when the first trajectory is the first arc.

18. The instruction device of embodiment 14, wherein the first region includes a closed region.

19. The instruction device of embodiment 14, wherein:
the processing unit causes the first reaction medium to be selected when the first relationship is an intersection relationship; and
the intersection relationship is in a specific condition, wherein the specific condition is one selected from a group consisting of:
a first condition that the first region partially overlaps the second region,
a second condition that the first region entirely overlaps the second region,
a third condition that the first region entirely covers the second region,
a fourth condition that a centroid of the first region is located within the second region,
a fifth condition that the first trajectory passes through the second region, and
a sixth condition that the first trajectory touches the second region.

20. The instruction device of embodiment 19, further configured to have a second motion, transforming the second motion into a feature being one of a second signal and a second trajectory, and determining whether a preset function of the icon is performed according to the feature after the processing unit conforms a selected status of the icon.

21. The instruction device of embodiment 20, wherein the second trajectory is one selected from a group consisting of a check mark, a letter "X" and a circle-shaped mark.

22. The instruction device of embodiment 19, further configured to have a second motion, analyzing an acceleration-deceleration distribution of the second motion, and determining whether a preset function of the icon is performed after the processing unit conforms a selected status of the icon.

23. The instruction device of embodiment 22, wherein the second motion is one selected from a group consisting of movements of drawing a check mark, a letter "X", a wavy line, a triangle, an arc and a circle.

24. The instruction device of embodiment 14, wherein the first motion is generated by at least one selected from a group consisting of a hand, an arm, a foot, a leg, a head, a neck, a shoulder and a waist.

25. An instruction device for communicating an instruction and an icon in an image area where at least a second icon is located near, comprising:
a motion sensing unit sensing a first motion to generate a corresponding first signal; and
a processing unit generating a first trajectory to determine a first region in the image area in response to the corresponding first region for a decision whether the icon shall be selected according to a relationship between the first region and a second region where at least two icons consisting of the first icon and the at least the second icon are together displayed in the image area.

26. The instruction device of embodiment 25, wherein:
the first trajectory includes at least one selected from a group consisting of a first arc having an arc angle, a combination of a second arc and a first line segment, and plural second line segments; and
the arc angle of the first arc is in a degree being one selected from a group consisting of 360°, near 360°, and beyond 360° when the first trajectory is the first arc.

27. The instruction device of embodiment 25, wherein the first region includes a closed region.

28. The instruction device of embodiment 25, wherein:
the processing unit causes the at least two icons to be selected when the first relationship is an intersection relationship; and
the intersection relationship is in a specific condition, wherein the specific condition is one selected from a group consisting of:
a first condition that the first region partially overlaps the second region,
a second condition that the first region entirely overlaps the second region,
a third condition that the first region entirely covers the second region,
a fourth condition that a centroid of the first region is located within the second region,
a fifth condition that the first trajectory passes through the second region, and
a sixth condition that the first trajectory touches the second region.

29. The instruction device of embodiment 25, further configured to have a selection motion to result in a specific state, wherein the specific state is one selected from a group consisting of:
a first state that the at least two icons have inverse videos sequentially displayed thereon, and
a second state that the first trajectory is scaled down into a second trajectory sequentially displayed on the at least two icons.

30. The instruction device of embodiment 29, wherein the selection motion is one selected from a group consisting of a yaw motion, a pitch motion and a roll motion.

31. The instruction device of embodiment 25, wherein the at least two icons have inverse videos sequentially displayed thereon through a pushbutton for selecting the first icon.

32. An instruction device for communicating an instruction and a first reaction medium in a specific area, comprising:
a motion sensing unit sensing a first motion to generate a corresponding first signal; and
a responding unit generating at least three reference positions to determine a first region in the image area in response to the corresponding first signal for a decision whether a communication between the instruction and the first reaction medium shall be conducted according to a relationship between the first region and a second region where the first reaction medium is located in the specific area.

33. The instruction device of embodiment 32, wherein the specific area is an image area.

34. The instruction device of embodiment 32, wherein the first reaction medium is an icon.

35. The instruction device of embodiment 32, wherein the responding unit is a processor.

36. The instruction device of embodiment 32, wherein the first reaction medium is frequently displayed in the specific area.

37. The instruction device of embodiment 32, wherein the at least three reference positions is used to form a specific trajectory.

38. The instruction device of embodiment 37, wherein:
the specific trajectory is a geometric pattern trajectory being one of a closed trajectory and a non-closed trajectory;
the closed trajectory is one selected from a group consisting of a circle, an ellipse, a polygon, a heart-shape line and a rose-shape line, wherein the polygon is one selected from a group consisting of a triangle, a square and a pentagon; and
the non-closed trajectory is one selected from a group consisting of an arc, a curve and a cycloid.

39. The instruction device of embodiment 38, wherein the first region is enclosed by the specific trajectory.

40. The instruction device of embodiment 32, wherein the second region is associated with the first reaction medium.

41. The instruction device of embodiment 32, wherein:
the relationship is an intersection relationship; and
the intersection relationship is in a specific condition, wherein the specific condition is one selected from a group consisting of:
a first condition that the first region entirely covers the second region,
a second condition that the first region partially covers the second region,
a third condition that the first region entirely overlaps the second region, and
a fourth condition that the first region partially overlaps the second region.

42. An instruction device for communicating an instruction and a first reaction medium in a specific area where at least a second reaction medium is located near, comprising:
a motion sensing unit sensing a first motion to generate a corresponding first signal; and
a responding unit generating at least three reference positions to determine a first region in the image area in response to the corresponding first region for a decision whether a communication between the instruction and the first reaction medium shall be conducted according to a relationship between the first region and a second region where at least two reaction mediums consisting of the first reaction medium and the at least the second reaction medium are together located in the specific area.

43. An instruction device for communicating an instruction and a first reaction medium in a specific area, comprising:
a sensing unit sensing a first instruction medium to generate a corresponding first signal; and
a responding unit generating at least three reference positions to determine a first region in the specific area in response to the corresponding first region for a decision whether the instruction shall be communicated to the first reaction medium according to a relationship between the first region and a second region where the first reaction medium is located in the specific area.

44. The instruction device of embodiment 43, wherein the first instruction medium is a motion.

45. The instruction device of embodiment 43, wherein:
the first instruction medium is a physical effect being one selected from a group consisting of an acoustic wave, a light wave, a non-contact force, a contact force and a mechanical force;
the non-contact force is one selected from a group consisting of an electromagnetic wave, an electric force, a magnetic force and an inertia force; and
the mechanical force is one selected from a group consisting of a pressure, a friction force and an elastic force.

46. An instruction device for communicating an instruction and a first reaction medium in a specific area, comprising:
a sensing unit sensing a first instruction medium to generate a corresponding first signal; and
a responding unit generating at least two reference positions in response to the corresponding first region for a decision whether a communication between the instruction and the first reaction medium shall be conducted according to a relationship between the first reaction medium and the at least two positional references.

47. The instruction device of embodiment 46, wherein the at least two reference positions are used to form one of a geometric pattern and a geometric region.

48. The instruction device of embodiment 46, wherein the communication is a specific operation being one selected from a group consisting of:
a first operation of communicating the instruction to the first reaction medium, and
a second operation of transmitting a feedback signal by the first reaction medium to the responding unit.

49. An instruction device for communicating an instruction and a first reaction medium in a specific area, comprising:
a sensing unit sensing a first instruction medium to generate a corresponding first signal; and
a responding unit generating at least two reference positions to constitute a geometric line in response to the corresponding first signal for a decision whether a communication between the instruction and the first reaction medium shall be conducted according to a relationship between the geometric line and the reaction medium.

50. The instruction device of embodiment 49, wherein the first relationship is a position relationship between the geometric line and a first region in the specific area where the first reaction medium is located.

51. The instruction device of embodiment 50, wherein the position relationship is whether an intersection relationship between the geometric line and the first region exists.

52. The instruction device of embodiment 51, wherein the intersection relationship is one selected from a group consisting of:
a first relationship that the geometric line passes through the first region; and
a second relationship that the geometric line touches a boundary of the first region.

53. The instruction device of embodiment 49, wherein the geometric line is a straight line.

54. An instruction device for communicating an instruction and a first reaction medium, comprising an instructing unit configured to send an instruction medium to determine a geometry reference for a decision whether a communication between the instruction and the first reaction medium shall be conducted according to a relationship between the geometry reference and the first reaction medium.

55. The instruction device of embodiment 54 wherein the geometric reference includes at least two reference positions, and the relationship is a first relationship between the at least two reference positions and the first reaction medium.

56. The instruction device of embodiment 54, wherein the instruction medium is a motion of the instructing unit to be transformed into a trajectory for defining the at least two reference positions.

57. The instruction device of embodiment 54, wherein the instruction medium is in a specific area, and the geometric reference includes at least three reference positions for the decision whether the communication between the instruction and the first reaction medium shall be conducted according to the relationship being a first relationship between a first region in the specific area commonly formed by the at least three reference positions and a second region in the specific area where the first reaction medium is located.

58. An instruction device for communicating an instruction and a first reaction medium, comprising:
an instructing unit configured to send an instruction medium to generate at least two reference positions for a decision whether a communication between the instruction and the first reaction medium shall be conducted according to a relationship between the at least two reference positions and the first reaction medium.

59. An instruction device for communicating an instruction and an icon in an image area, comprising:
an instruction unit configured to perform a first motion, transforming the first motion into a first trajectory to determine a first region in the image area for a decision whether a communication between the instruction and the first reaction medium shall be conducted according to a relationship between the first region and a second region where the icon is displayed in the image area.

60. The instruction device of embodiment 59, wherein the instruction unit comprises:
a motion sensing unit transforming a first motion into a first signal; and
a processing unit transforming the first signal into a first trajectory, determining a first region according to the first trajectory for a decision whether a communication between the instruction and the first reaction medium shall be conducted according to the first region and the second region.

61. The instruction device of embodiment 60, wherein the motion sensing unit comprises:
a gyroscope sensing the first motion for producing the first signal.

62. The instruction device of embodiment 60, wherein the motion sensing unit comprises:
a gyroscope having at least two sensing degrees of freedom and sensing the first motion for producing a first portion of the first signal; and
an accelerometer having at least two sensing degrees of freedom and sensing the first motion for producing a second portion of the first signal.

63. A selection device of embodiment 60, wherein the processing unit includes one selected from a group consisting of a microcontroller, a microprocessor, a digital signal processor and a central processing unit.

64. A selection device of embodiment 59, wherein:
the first motion is formed by a hand driving the selection unit; and
the first motion includes at least one of a three-dimensional motion and a two-dimensional motion.

65. A selection device of embodiment 59, wherein:
the first trajectory includes at least one selected from a group consisting of a first arc having an arc angle, a combination of a second arc and a first line segment, and plural second line segments; and
the arc angle of the first arc is in a degree being one selected from a group consisting of 360°, near 360°, and beyond 360° when the first trajectory is the first arc.

66. A selection device of embodiment 59, wherein the first region includes a closed area.

67. The instruction device of embodiment 59, wherein:
the instructing unit communicates the instruction to the icon when the first relationship is an intersection relationship; and
the intersection relationship is in a specific condition, wherein the specific condition is one selected from a group consisting of:
a first condition that the first region partially overlaps the second region,
a second condition that the first region entirely overlaps the second region,
a third condition that the first region entirely covers the second region,
a fourth condition that a centroid of the first region is located within the second region,
a fifth condition that the first trajectory passes through the second region, and
a sixth condition that the first trajectory touches the second region.

68. The instruction device of embodiment 59, wherein:
the icon is selected after the instruction unit conforms the instruction is communicated to the icon.

69. The instruction device of embodiment 68, wherein:
the instruction unit is further configured to have a second motion, transforms the second motion into a second trajectory, and determine whether a preset function of the icon is performed according to the second trajectory after the instruction unit conforms a selected status of the icon.
the second trajectory is one selected from a group consisting of a check mark, a letter "X" and a circle-shaped mark.

70. The instruction device of embodiment 68, wherein the instruction unit is further configured to have a second motion, analyze an acceleration-deceleration distribution of the second motion, and determine whether a preset function of the icon is performed after the instruction unit conforms a selected status of the icon.

71. The instruction device of embodiment 70, wherein the second motion is one selected from a group consisting of movements of drawing a check mark, a letter "X", a wavy line, a triangle, an arc and a circle.

72. An instruction device for communicating an instruction and a first reaction medium in a specific area, comprising:

an instruction unit configured to have a first motion, transforming the first motion into a first trajectory to determine a first region in the image area for a decision whether a communication between the instruction and the first reaction medium shall be conducted according to a relationship between the first region and a second region where the first reaction medium is displayed in the image area.

73. An instruction communicating method for communicating an instruction and a first reaction medium, comprising:

providing a geometry reference in response to an instruction medium; and deciding whether a communication between the instruction and the first reaction medium shall be conducted according to a relationship between the geometry reference and the first reaction medium.

74. The instruction communicating method of embodiment 73, wherein the geometry reference includes at least two reference positions, and the relationship is a first relationship between the at least two reference positions and the first reaction medium.

75. The instruction communicating method of embodiment 74, further comprising steps of:

providing a specific area to display therein the first reaction medium; and forming a geometrical line by the at least two positional references wherein the first relationship is a positional relationship between the geometrical line and the first reaction medium in the specific area.

76. The instruction communicating method of embodiment 73, wherein the geometry reference includes at least three reference positions, and the instruction communicating method further comprising a step of:

forming a first region by the at least three reference positions wherein the relationship is a first relationship between the first region and a second region in the specific area where the first reaction medium is located.

77. The instruction communicating method of embodiment 73, wherein the geometry reference includes a trajectory, and the instruction communicating method further comprising a step of:

determining a first region according to the trajectory, wherein the relationship is a first relationship between the first region and a second region in the specific area where the first reaction medium is located.

78. An instruction communicating method for communicating an instruction and a first reaction medium, comprising:

providing at least two positional references in response to an instruction medium; and deciding whether a communication between the instruction and the first reaction medium shall be conducted according to a relationship between the at least two positional references and the first reaction medium.

79. An instruction communicating method for communicating an instruction and a first reaction medium in a specific area, comprising:

generating at least two reference positions to form a geometric line in response to a first motion;

deciding whether a communication between the instruction and the first reaction medium shall be conducted according to a relationship between the geometric line and a second region where the first reaction medium is to be displayed in the image area.

80. The instruction communicating method of embodiment 79, wherein the geometric line is a straight line.

81. An instruction communicating method for communicating an instruction and a first reaction medium in a specific area, comprising:

generating at least three reference positions in response to a first motion;

determining a first region in response to the at least three reference positions;

deciding whether a communication between the instruction and the first reaction medium shall be conducted according to a relationship between the first region and a second region where the first reaction medium is to be displayed in the image area.

82. The instruction communicating method of embodiment 81, wherein:

the specific area is an image area;

the first reaction medium is an icon; and the first region is located in the image area.

83. An instruction communicating method for communicating an instruction and an icon in an image area, comprising:

transforming a first motion into a first trajectory;

determine a first region in the image area according to the first trajectory; and deciding whether a communication between the instruction and the first reaction medium shall be conducted according to a relationship between the first region and a second region where the icon is to be displayed in the image area.

84. An instruction device for communicating an instruction and a first reaction medium, comprising:

a sensing unit sensing an first instruction medium to generate a corresponding first signal; and a responding unit temporarily generating one selected from a group consisting of a reference parameter, a positional reference and a reference signal in response to the corresponding first signal for a decision whether a communication between the instruction and the first reaction medium shall be conducted according to a relationship between the first reaction medium and the selected one of a reference parameter, a positional reference and a reference signal positional reference.

85. An instruction device for communicating an instruction and a first reaction medium in a specific area, comprising:

a sensing unit sensing a first instruction medium to generate a corresponding first signal; and a responding unit temporarily generating a reference position in response to the corresponding first signal for a decision whether a communication between the instruction and the first reaction medium shall be conducted according to a relationship between the reference position and the first reaction medium.

86. The instruction device of embodiment 85, wherein the reference position is located in the specific area.

87. The instruction device of embodiment 85, wherein the reference position is generated for a period between 0.1 seconds and 3 seconds.

88. The instruction device of embodiment 85, wherein the relationship is a position relationship between the reference position and the first reaction medium in the specific area.

89. The instruction device of embodiment 88, wherein the first reaction medium occupies a second region in the specific area.

90. The instruction device of embodiment 89, wherein:
the responding unit further generates a geometric pattern on the reference position in response to the corresponding first signal;
the geometric pattern is one selected from a group consisting of a circle, an ellipse and a polygon; and
the polygon is one selected from a group consisting of a triangle, a square and a pentagon.

91. The instruction device of embodiment 90, wherein:
the responding unit further makes a decision whether the instruction is communicated to the reaction medium according to the position relationship;
the position relationship is one whether an intersection relationship between the geometric pattern and the first region exists; and
the intersection relationship is in a specific condition, wherein the specific condition is one selected from a group consisting of:
  a first condition that the geometric pattern covers the first region,
  a second condition that the geometric pattern overlaps the first region, and
  a third condition that the geometric pattern intersects the first region.

92. The instruction device of embodiment 89, wherein whether the instruction is communicated to the first reaction medium is decided according to whether the reference position is located in the second region.

93. The instruction device of embodiment 92, wherein the instruction includes a command message for selecting the first reaction medium and changing a specific presentation of the selected reaction medium.

94. The instruction device of embodiment 92, wherein the specific presentation is one selected from a group consisting of:
  a first presentation of displaying an inverse video of the selected reaction medium,
  a second presentation of changing a color of the selected reaction medium,
  a third presentation of displaying by scaling up the selected reaction medium with a same-length-width ratio,
  a fourth presentation of displaying by scaling up the selected reaction medium with a different-length-width ratio,
  a fifth presentation of displaying by flicking the selected reaction medium,
  a sixth presentation of displaying by interchanging colors of the selected reaction medium, and
  a seventh presentation of generating an acoustic wave.

95. An instruction device for communicating an instruction and a first reaction medium in a specific area, comprising:
a sensing unit sensing a first instruction medium to generate a corresponding first signal; and
a responding unit temporarily providing a reference position in response to the corresponding first signal for a decision whether a communication between the instruction and the first reaction medium shall be conducted according to a relationship between the reference position and the first reaction medium.

96. The instruction device of embodiment 95, wherein the first reaction medium is located in the specific area.

97. The instruction device of embodiment 96, wherein the reference position is located in the specific area.

98. An instruction device for communicating an instruction and a first reaction medium, comprising:
a sensing unit sensing a first instruction medium to generate a corresponding first signal; and
a responding unit temporarily generating a reference signal in response to the corresponding first signal for a decision whether a communication between the instruction and the first reaction medium shall be conducted according to a relationship between the reference signal and the first reaction medium.

99. The instruction device of embodiment 98, wherein the reference signal is a first geometric feature being one of a first position and a first region, and the first reaction medium is located in a second geometric feature being one of a second position and a second region.

100. The instruction device of embodiment 99, wherein:
the relationship is whether an intersection relationship exists; and
the intersection relationship is in a specific condition, wherein the specific condition is one selected from a group consisting of:
  a first condition that the first and the second geometric features mutually covers,
  a second condition that the first and the second geometric features mutually overlaps, and
  a third condition that the first and the second geometric features mutually intersects.

101. The instruction device of embodiment 98, further generating an instruction signal according to whether the relationship is satisfied, wherein and the instruction signal causes the instruction device to generate a different acoustic wave, a different light wave or a different vibration wave.

102. An instruction device for communicating an instruction and a first reaction medium, comprising:
a sensing unit sensing a first instruction medium to generate a corresponding first signal; and
a responding unit temporarily generating a reference parameter in response to the corresponding first signal for a decision whether a communication between the instruction and the first reaction medium shall be conducted according to a relationship between the reference parameter and the first reaction medium.

103. The instruction device of embodiment 102, wherein the reference parameter is one selected from a group consisting of a reference position, a reference geometric pattern, a geometric region and a reference signal.

104. The instruction device of embodiment 102, wherein the communication is a specific operation being one selected from a group consisting of:
  a first operation of communicating the instruction to the reaction medium, and
  a second operation of transmitting a feedback signal by the reaction medium to the responding unit.

105. An instruction device for communicating an instruction and a first reaction medium, comprising an instructing unit configured to:
send out an instruction medium to temporarily generate one selected from a group consisting of a reference parameter, a positional reference and a reference signal; and
decide whether a communication between the instruction and the first reaction medium shall be conducted according to a relationship between the first reaction medium and the selected one of the reference parameter, the positional reference and the reference signal.

106. An instruction device for communicating an instruction and a first reaction medium, comprising:
an instruction unit configured to send out an instruction media to temporarily generate a reference parameter for a decision whether a communication between the instruction and the first reaction medium shall be conducted according to a relationship between the reference parameter and the first reaction medium.

107. An instruction device for communicating an instruction and a first reaction medium in a specific area, comprising:
an instruction unit configured to send out an instruction medium to temporarily provide a reference position for a decision whether a communication between the instruction and the first reaction medium shall be conducted according to a relationship between the reference position and the first reaction medium.

108. An instruction device for communicating an instruction and a first reaction medium, comprising:
an instruction unit configured to send out an instruction medium to temporarily generate a reference signal for a decision whether a communication between the instruction and the first reaction medium shall be conducted according to a relationship between the reference signal and the first reaction medium.

109. The instruction device of embodiment 108, wherein the reference signal is one of a position and a region having a geometric feature being one of a geometric shape and a geometric profile.

110. The instruction device of embodiment 109, wherein:
the instructing unit further generates a geometric pattern similar to the geometric feature in response to the geometric feature of the region; and
the geometric pattern is one selected from a group consisting of a circle, an ellipse, a square, a triangle and a polygon.

111. An instruction communicating method for communicating an instruction and a first reaction medium, comprising:
temporarily providing one selected from a group consisting of a reference parameter, a positional reference and a reference signal in response to an instruction medium; and
deciding whether a communication between the instruction and the first reaction medium shall be conducted based on a relationship between the first reaction medium and the selected one of the reference parameter, the positional reference and the reference signal.

112. An instruction communicating method for communicating an instruction and a first reaction medium, comprising:
temporarily providing a reference parameter in response to a first instruction media; and
deciding whether a communication between the instruction and the first reaction medium shall be conducted according to a relationship between the reference parameter and the first reaction medium.

113. An instruction communicating method for communicating an instruction and a first reaction medium, comprising:
temporarily generating at least a reference position in response to a first motion;
deciding whether a communication between the instruction and the first reaction medium shall be conducted according to a relationship between the reference position and the first reaction medium.

114. The instruction communicating method of embodiment 113, wherein:
the first reaction medium is located in a specific area;
the reference position is located in the specific area and is used to determine a first region; and
the first reaction medium is located in the specific area and is used to determine a second region.

115. An instruction communicating method for communicating an instruction and a first reaction medium, comprising:
temporarily providing a reference signal in response to a first instruction medium;
deciding whether a communication between the instruction and the first reaction medium shall be conducted according to a relationship between the reference signal and the first reaction medium.

116. The instruction communicating method of embodiment 115, wherein:
the first instruction medium is a first motion;
the reference signal is a first position signal; and
the reference signal is temporarily provided for a period between 0.1 seconds and 3 seconds.

117. The instruction communicating method of embodiment 116, further comprising the following steps:
transforming the first motion into the first position signal; and
transforming the first position signal into a first trajectory.

118. The instruction communicating method of embodiment 117, further comprising the following steps:
starting the first motion;
initializing a reference point of the first trajectory; and
correlating with a posture of the first motion for performing a calibration and a compensation of the reference point.

119. The instruction communicating method of embodiment 116, wherein:
the first reaction medium is located in a specific area;
the first position signal is located in the specific area and is used to determine a first region; and
the first reaction medium is located in the specific area and is used to determine a second region.

120. The instruction communicating method of embodiment 119, further comprising a step of:
communicating the instruction to the reaction medium when the relationship is a first relationship between the first region and the second area and the first relationship is in a specific condition, wherein the specific condition is one selected from a group consisting of:
a first condition that the first region partially overlaps the second region,
a second condition that the first region entirely overlaps the second region,
a third condition that the first region entirely covers the second region, and
a fourth condition that a centroid of the first region is located in the second region.

121. The instruction communicating method of embodiment 115, wherein the instruction is communicated to the reaction medium to cause the reaction medium is in a function prepared status, the method further comprising steps of:
transforming a second motion into a second trajectory; and
deciding whether a preset function of the first reaction medium is performed according to the second trajectory.

122. An instruction device for communicating an instruction and a first reaction medium, comprising:
a first responding unit generating a signal in response to an instruction medium; and
a second responding unit generating at least two positional references in response to the signal for a decision whether a communication between the instruction and the first reaction medium shall be conducted according to a relationship between the first reaction medium and the at least two positional references.

123. An instruction device for communicating an instruction and a first reaction medium, comprising an instructing unit configured to send an instruction medium to generate at least two reference signals for a decision whether a communication between the instruction and the first reaction medium shall be conducted according to a relationship between the at least two reference signals and the first reaction medium.

124. An instruction device for communicating an instruction and a first reaction medium, comprising:
 a first responding unit generating a signal in response to an instruction medium; and
 a second responding unit temporarily generating one selected from a group consisting of a reference parameter, a positional reference and a reference signal in response to the signal for a decision whether a communication between the instruction and the first reaction medium shall be conducted according to a relationship between the first reaction medium and the selected one of the reference parameter, the positional reference and the reference signal.

125. An instruction device for communicating an instruction and a first reaction medium, comprising:
 a notifying unit causing generated a corresponding signal in response to an instruction medium; and
 a responding unit generating one selected from a group consisting of a reference parameter, a positional reference and a reference signal in response to the corresponding signal for a decision whether a communication between the instruction and the first reaction medium shall be conducted according to a relationship between the first reaction medium and the selected one of a reference parameter, a positional reference and a reference signal.

The progressiveness of the present invention in relation to the operation of the 3D Air Mouse in the prior art is described as follows. In primary, in the present invention, a trajectory is determined in response to a motion. A region circled by the trajectory, or the trajectory itself is compared with a comparison region associated with the target icon; the intersection relationship being a geometric relationship between a first region and a second region, between a trajectory and a third region, or between a point and a region, is determined for a decision whether the icon is to be selected. In the practical operation, a trajectory determined in response to the natural motion of the hand is used to select the item of the electronic menu on the human-machine graphic interface. After the item on the menu is selected, the natural movement of the wrist and the arm is used to cause the preset function of the item to be performed.

This intuitive operation complying with the human engineering is not only possessing the novelty but also effective in the aspect that the free operation of the selection device, such as the 3D mouse device, develops the convenience. The technical feature of the present invention is greatly different from that of the existing technique on the market. The existing technique, e.g. provided by Gyration 3D remote controller or Logitech Air Mouse, follows the operation scheme of the 2D mouse device regarding the plane motion confined in the table area, and only can drive the curser on the common screen; a cursor or an object on the screen is moved to select the icon on the screen first, and then the active pushbutton of the conventional mouse device is clicked twice quickly to cause the preset function of the icon to be performed. In fact, this conventional operation scheme cannot fully utilize the 3D mouse device, which further possesses another freedom of the space dimension, to give the desired convenience of the additional freedom.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. An instruction device for communicating an instruction and a first reaction medium, comprising:
 a sensing unit sensing a first instruction medium to generate a corresponding first signal; and
 a responding unit generating a geometric reference in response to the corresponding first signal for a decision whether a communication between the instruction and the first reaction medium shall be conducted according to a relationship between the geometric reference and the first reaction medium.

2. An instruction device according to claim 1, wherein the communication is transmitting the instruction to the first reaction medium.

3. An instruction device according to claim 1 wherein the communication is conducted by causing the first reaction medium to be operated.

4. An instruction device according to claim 1 wherein the communication is transmitting a feedback signal by the first reaction medium to the sensing unit.

5. An instruction device according to claim 1 wherein the first reaction medium is disposed in a specific area.

6. An instruction device according to claim 5 wherein:
 the geometric reference includes a first trajectory;
 the responding unit further determines a first region in the specific area according to the first trajectory; and
 the relationship is a first relationship between the first region and a second region in the specific area where the first reaction medium is located.

7. An instruction device according to claim 6 wherein:
 the specific area is an image area;
 the specific area is disposed on one selected from a group consisting of a screen, a monitor, and a display,
 the first reaction medium is an icon;
 the first instruction medium is a first motion;
 the second region further comprises a second reaction medium near the first reaction medium;
 the sensing unit is a motion sensing unit and the responding unit is a processing unit;
 the communication is conducted to decide whether the icon either is to be selected or has been selected;
 the instruction is a selection instruction;
 the processing unit further transforms the corresponding first signal into the first trajectory;
 the first trajectory includes at least one selected from a group consisting of a first arc having an arc angle, a combination of a second arc and a first line segment, and plural second line segments, wherein the arc angle of the first arc is in a degree being one selected from a group consisting of 180°, and beyond 180° when the first trajectory is the first arc;
 the first region includes a closed region;
 the first motion is generated by at least one selected from a group consisting of a hand, an arm, a foot, a leg, a head, a neck, a shoulder and a waist;
 the processing unit causes the first reaction medium to be selected when the first relationship is an intersection relationship; and
 the intersection relationship is in a specific condition, wherein the specific condition is one selected from a group consisting of:
  a first condition that the first region partially overlaps the second region,
  a second condition that the first region entirely overlaps the second region,
  a third condition that the first region entirely covers the second region, a fourth condition that a centroid of the first region is located within the second region, a fifth condition that the first trajectory passes through the second region, and a sixth condition that the first trajectory touches the second region.

8. An instruction device according to claim 7, further configured to have a second motion, transforming the second motion into a feature being one of a second signal and a second trajectory, and determining whether a preset function of the icon is performed according to the feature after the processing unit conforms a selected status of the icon, wherein the second trajectory is one selected from a group consisting of a check mark, a letter "X" and a circle-shaped mark.

9. An instruction device according to claim 7, further configured to have a second motion, analyzing an acceleration-deceleration distribution of the second motion, and determining whether a preset function of the icon is performed after the processing unit conforms a selected status of the icon, wherein the second motion is one selected from a group consisting of movements of drawing a check mark, a letter "X", a wavy line, a triangle, an arc and a circle.

10. An instruction device according to claim 5 wherein:
the first instruction medium is a first motion;
the geometric reference includes a first trajectory;
the responding unit further determines a first region in the specific area according to the first trajectory;
the specific area further comprises a specific region where at least a second reaction medium near the first reaction medium is disposed;
the relationship is a first relationship between the first region and a second region in the specific area where at least two reaction mediums consisting of the first and at least the second reaction mediums are together located; and
the communication is conducted to decide whether the first reaction medium is to be selected.

11. An instruction device according to claim 10, wherein:
the first trajectory includes at least one selected from a group consisting of a first arc having an arc angle, a combination of a second arc and a first line segment, and plural second line segments;
the arc angle of the first arc is in a degree being one selected from a group consisting of 360°, near 360°, and beyond 360° when the first trajectory is the first arc;
the responding unit causes the at least two reaction mediums to be selected when the first relationship is an intersection relationship; and
the at least two reaction mediums have inverse videos sequentially displayed thereon through a pushbutton for selecting the first reaction medium.

12. An instruction device according to claim 11, further configured to have a selection instruction medium to result in a specific state, wherein:
the selection instruction medium is a selection motion being one selected from a group consisting of a yaw motion, a pitch motion and a roll motion; and
the specific state is one selected from a group consisting of:
a first state that the at least two reaction mediums have inverse videos sequentially displayed thereon, and
a second state that the first trajectory is scaled down into a second trajectory sequentially displayed on the at least two reaction mediums.

13. An instruction device according to claim 5 wherein:
the geometric reference includes at least three reference positions; and the responding unit further determines a first region in the specific area according to the at least three reference positions; and
the relationship is a first relationship between the first region and a second region in the specific area where the first reaction medium is located.

14. An instruction device according to claim 13, wherein:
the first instruction medium is a physical effect being one selected from a group consisting of an acoustic wave, a light wave, a non-contact force, a contact force and a mechanical force, wherein the non-contact force is one selected from a group consisting of an electromagnetic wave, an electric force, a magnetic force and an inertia force, and the mechanical force is one selected from a group consisting of a pressure, a friction force and an elastic force;
the responding unit is a processor;
the first reaction medium is frequently displayed in the specific area;
the at least three reference positions is used to form a specific trajectory;
the specific trajectory is a geometric pattern trajectory being one of a closed trajectory and a non-closed trajectory, wherein the closed trajectory is one selected from a group consisting of a circle, an ellipse, a polygon, a heart-shape line and a rose-shape line, the polygon is one selected from a group consisting of a triangle, a square and a pentagon, and the non-closed trajectory is one selected from a group consisting of an arc, a curve and a cycloid;
the first region is enclosed by the specific trajectory;
the second region is associated with the first reaction medium;
the first relationship is an intersection relationship; and
the intersection relationship is in a specific condition, wherein the specific condition is one selected from a group consisting of:
a first condition that the first region entirely covers the second region,
a second condition that the first region partially covers the second region,
a third condition that the first region entirely overlaps the second region, and
a fourth condition that the first region partially overlap the second region.

15. An instruction device according to claim 5 wherein:
the specific area further comprises a specific region where at least a second reaction medium near the first reaction medium is disposed;
the geometric reference includes at least three reference positions;
the responding unit further determines a first region in the specific area according to the at least three reference positions; and
the relationship is a first relationship between the first region and a second region in the specific area where at least two reaction mediums consisting of the first and at least the second reaction mediums are together located.

16. An instruction device according to claim 5 wherein:
the geometric reference includes at least two reference positions; and
the relationship is a first relationship between the at least two reference positions and the first reaction medium.

17. An instruction device according to claim 16 wherein:
the at least two reference positions are used to form one of a geometric pattern and a geometric region; and the communication is a specific operation being one selected from a group consisting of:
a first operation of communicating the instruction to the first reaction medium, and
a second operation of transmitting a feedback signal by the first reaction medium to the responding unit.

18. An instruction device according to claim 5 wherein:
the geometric reference includes two reference positions;
the responding unit further determines a geometric line according to the two reference positions; and
the relationship is a first relationship between the geometric line and the first reaction medium.

19. An instruction device according to claim 18, wherein:
the first relationship is a position relationship between the geometric line and a first region in the specific area where the first reaction medium is located;
the geometric line is a straight line;
the position relationship is whether an intersection relationship between the geometric line and the first region exists; and
the intersection relationship is one selected from a group consisting of:
a second relationship that the geometric line passes through the first region; and
a third relationship that the geometric line touches a boundary of the first region.

20. An instruction device for communicating an instruction and a first reaction medium, comprising an instructing unit configured to send an instruction medium to determine a geometry reference for a decision whether a communication between the instruction and the first reaction medium shall be conducted according to a relationship between the geometry reference and the first reaction medium.

21. An instruction device according to claim 20 wherein the geometry reference includes at least two reference positions, and the relationship is a first relationship between the at least two reference positions and the first reaction medium.

22. An instruction device according to claim 20 wherein:
the first reaction medium is disposed in a specific area;
the instructing unit further transforms the instruction medium into the geometry reference including a first trajectory, and determines a first region according to the first trajectory;
the relationship is a first relationship between the first region and a second region in the specific area where the first reaction medium is located;
the first reaction medium is an icon, the specific area is an image area, and the instruction medium is a first motion of the instructing unit;
the instructing unit comprises:
a motion sensing unit transforming the first motion into a first signal; and
a processing unit transforming the first signal into the first trajectory, determining the first region according to the first trajectory for the decision whether the communication between the instruction and the icon shall be conducted according to the first region and the second region.

23. An instruction device according to claim 22, wherein:
the first motion is formed by a hand driving the selection unit;
the first motion includes at least one of a three-dimensional motion and a two-dimensional motion;
the first trajectory includes at least one selected from a group consisting of a first arc having an arc angle, a combination of a second arc and a first line segment, and plural second line segments, wherein the arc angle of the first arc is in a degree being one selected from a group consisting of 360°, near 360°, and beyond 360° when the first trajectory is the first arc;
the first region includes a closed area;
the instructing unit communicates the instruction to the icon when the first relationship is an intersection relationship;
the icon is selected after the instruction unit conforms the instruction is communicated to the icon.

24. An instruction device according to claim 23, wherein:
the motion sensing unit comprises a gyroscope sensing the first motion for producing the first signal; and
the processing unit includes one selected from a group consisting of a microcontroller, a microprocessor, a digital signal processor and a central processing unit;
the instruction unit is further configured to have a second motion, transforms the second motion into a second trajectory, and determine whether a preset function of the icon is performed according to the second trajectory after the instruction unit conforms a selected status of the icon; and
the second trajectory is one selected from a group consisting of a check mark, a letter "X" and a circle-shaped mark.

25. An instruction device according to claim 23, wherein:
the motion sensing unit comprises:
a gyroscope having at least two sensing degrees of freedom and sensing the first motion for producing a first portion of the first signal; and
an accelerometer having at least two sensing degrees of freedom and sensing the first motion for producing a second portion of the first signal;
the instruction unit is further configured to have a second motion, analyze an acceleration-deceleration distribution of the second motion, and determine whether a preset function of the icon is performed after the instruction unit conforms a selected status of the icon; and
the second motion is one selected from a group consisting of movements of drawing a check mark, a letter "X", a wavy line, a triangle, an arc and a circle.

26. An instruction communicating method for communicating an instruction and a first reaction medium, comprising:
providing a geometry reference in response to an instruction medium; and
deciding whether a communication between the instruction and the first reaction medium shall be conducted according to a relationship between the geometry reference and the first reaction medium.

27. An instruction communicating method according to claim 26, wherein the geometry reference includes at least two reference positions, and the relationship is a first relationship between the at least two reference positions and the first reaction medium.

28. An instruction communicating method according to claim 26, further comprising a step of:
providing a specific area to display therein the first reaction medium, wherein the instruction medium is a motion.

29. An instruction communicating method according to claim 28, wherein the geometry reference includes two reference positions, and the instruction communicating method further comprising a step of:
forming a geometrical line by the two positional references, wherein the relationship is a positional relationship between the geometrical line and the first reaction medium in the specific area, wherein the geometric line is a straight line.

30. An instruction communicating method according to claim 28, wherein the geometry reference includes at least three reference positions, and the instruction communicating method further comprising a step of:
   forming a first region by the at least three reference positions wherein the relationship is a first relationship between the first region and a second region in the specific area where the first reaction medium is located.

31. An instruction communicating method according to claim 28, wherein the geometry reference includes a trajectory, and the instruction communicating method further comprising a step of:
   determining a first region according to the trajectory, wherein the relationship is a first relationship between the first region and a second region in the specific area where the first reaction medium is located.

32. An instruction device for communicating an instruction and a first reaction medium, comprising:
   a sensing unit sensing an instruction medium to generate a corresponding signal; and
   a responding unit temporarily generating a reference feature being one selected from a group consisting of a reference parameter, a positional reference and a reference signal in response to the corresponding signal for a decision whether a communication between the instruction and the first reaction medium shall be conducted according to a relationship between the first reaction medium and the selected one of a reference parameter, a positional reference and a reference signal.

33. An instruction device according to claim 32, wherein the reference feature is the positional reference being a reference position, and the relationship is a first relationship between the reference position and the first reaction medium.

34. An instruction device according to claim 33, wherein:
   the first reaction medium is located in the specific area;
   the reference position is located in the specific area;
   the first relationship is a position relationship between the reference position and the first reaction medium in the specific area;
   the reference position is generated for a period between 0.1 seconds and 3 seconds;
   the first reaction medium occupies a first region in the specific area;
   the responding unit further generates a geometric pattern on the reference position in response to the corresponding signal, wherein the geometric pattern is one selected from a group consisting of a circle, an ellipse and a polygon, and the polygon is one selected from a group consisting of a triangle, a square and a pentagon;
   the responding unit further makes a decision whether the instruction is communicated to the first reaction medium according to the position relationship;
   the position relationship is one whether an intersection relationship between the geometric pattern and the first region exists;
   the intersection relationship is in a specific condition, wherein the specific condition is one selected from a group consisting of:
      a first condition that the geometric pattern covers the first region,
      a second condition that the geometric pattern overlaps the first region, and
      a third condition that the geometric pattern intersects the first region;
   whether the instruction is communicated to the first reaction medium is decided according to whether the reference position is located in the first region;
   the instruction includes a command message for selecting the first reaction medium and changing a specific presentation of the selected reaction medium; and
   the specific presentation is one selected from a group consisting of:
      a first presentation of displaying an inverse video of the selected reaction medium,
      a second presentation of changing a color of the selected reaction medium,
      a third presentation of displaying by scaling up the selected reaction medium with a same-length-width ratio,
      a fourth presentation of displaying by scaling up the selected reaction medium with a different-length-width ratio,
      a fifth presentation of displaying by flicking the selected reaction medium,
      a sixth presentation of displaying by interchanging colors of the selected reaction medium, and
      a seventh presentation of generating a sound.

35. An instruction device according to claim 32, wherein the reference feature is the reference signal, and the relationship is a first relationship between the reference signal and the first reaction medium.

36. An instruction device according to claim 35, wherein:
   the reference signal is a first geometric feature being one of a first position and a first region;
   the first reaction medium is located in a second geometric feature being one of a second position and a second region;
   the first relationship is whether an intersection relationship exists;
   the intersection relationship is in a specific condition, wherein the specific condition is one selected from a group consisting of:
      a first condition that the first and the second geometric features mutually covers,
      a second condition that the first and the second geometric features mutually overlaps, and
      a third condition that the first and the second geometric features mutually intersects; and
   the responding unit generates an instruction signal according to whether the first relationship is satisfied, and the instruction signal causes the instruction device to generate a different sound wave, a different light wave or a different vibration wave.

37. An instruction device according to claim 32, wherein the reference feature is the reference parameter, and the relationship is a first relationship between the reference parameter and the first reaction medium.

38. An instruction device according to claim 37, wherein:
   the reference parameter is one selected from a group consisting of a reference position, a reference geometric pattern, a geometric region and a reference signal; and
   the communication is a specific operation being one selected from a group consisting of:
      a first operation of communicating the instruction to the first reaction medium, and
      a second operation of transmitting a feedback signal by the first reaction medium to the responding unit.

39. An instruction device for communicating an instruction and a first reaction medium, comprising an instructing unit configured to:
   send out an instruction medium to temporarily generate a reference feature being one selected from a group consisting of a reference parameter, a positional reference and a reference signal; and decide whether a communication between the instruction and the first reaction medium shall be conducted according to a relationship between the first reaction medium and the selected one of the reference parameter, the positional reference and the reference signal.

40. An instruction device according to claim 39, wherein:
the reference signal is one of a position and a region having a geometric feature being one of a geometric shape and a geometric profile;
the instructing unit further generates a geometric pattern similar to the geometric feature in response to the geometric feature of the region; and
the geometric pattern is one selected from a group consisting of a circle, an ellipse, a square, a triangle and a polygon.

41. An instruction communicating method for communicating an instruction and a first reaction medium, comprising steps of:
temporarily providing one selected from a group consisting of a reference parameter, a positional reference and a reference signal in response to an instruction medium; and
deciding whether a communication between the instruction and the first reaction medium shall be conducted based on a relationship between the first reaction medium and the selected one of the reference parameter, the positional reference and the reference signal.

42. An instruction communicating method according to claim 41, wherein the reference feature is the reference parameter, and the relationship is a first relationship between the reference parameter and the first reaction medium.

43. An instruction communicating method according to claim 41, wherein:
the reference feature is the positional reference being a reference position, and the relationship is a first relationship between the reference position and the first reaction medium;
the first reaction medium is located in a specific area;
the reference position is located in the specific area and is used to form a first region; and
the first reaction medium is located in the specific area and is used to form a second region.

44. An instruction communicating method according to claim 41, wherein:
the reference feature is the reference signal, and the relationship is a first relationship between the reference signal and the first reaction medium;
the instruction medium is a first motion;
the reference signal is a first position signal;
the reference signal is temporarily provided for a period between 0.1 seconds and 3 seconds;
the first reaction medium is located in a specific area;
the first position signal is located in the specific area and is used to form a first region;
the first reaction medium is located in the specific area and is used to form a second region; and
the instruction is communicated to the first reaction medium to cause the first reaction medium is in a function prepared status.

45. An instruction communicating method according to claim 44, further comprising steps of:
transforming the first motion into the first position signal;
transforming the first position signal into a first trajectory having a reference point;
communicating the instruction to the first reaction medium when the relationship between the first region and the second area is in a specific condition, wherein the specific condition is one selected from a group consisting of:
a first condition that the first region partially overlaps the second region,
a second condition that the first region entirely overlaps the second region,
a third condition that the first region entirely covers the second region, and
a fourth condition that a centroid of the first region is located within the second region;
transforming a second motion into a second trajectory; and
deciding whether a preset function of the first reaction medium is to be performed according to the second trajectory.

46. An instruction communicating method according to claim 45, further comprising steps of:
starting the first motion having a posture;
initializing the reference point of the first trajectory; and
correlating with the posture of the first motion for performing a calibration and a compensation for the reference point.

47. An instruction device for communicating an instruction and a first reaction medium, comprising:
a first responding unit generating a signal in response to an instruction medium; and
a second responding unit generating at least two positional references in response to the signal for a decision whether a communication between the instruction and the first reaction medium shall be conducted according to a relationship between the first reaction medium and the at least two positional references.

48. An instruction device for communicating an instruction and a first reaction medium, comprising an instructing unit configured to send an instruction medium to generate at least two reference signals for a decision whether a communication between the instruction and the first reaction medium shall be conducted according to a relationship between the at least two reference signals and the first reaction medium.

49. An instruction device for communicating an instruction and a first reaction medium, comprising:
a first responding unit generating a signal in response to an instruction medium; and
a second responding unit temporarily generating one selected from a group consisting of a reference parameter, a positional reference and a reference signal in response to the signal for a decision whether a communication between the instruction and the first reaction medium shall be conducted according to a relationship between the first reaction medium and the selected one of the reference parameter, the positional reference and the reference signal.

50. An instruction device for communicating an instruction and a first reaction medium, comprising:
a notifying unit causing generated a corresponding signal in response to an instruction medium; and
a responding unit generating one selected from a group consisting of a reference parameter, a positional reference and a reference signal in response to the corresponding signal for a decision whether a communication between the instruction and the first reaction medium shall be conducted according to a relationship between the first reaction medium and the selected one of a reference parameter, a positional reference and a reference signal.

* * * * *